US012706662B2

(12) United States Patent
Zhang et al.

(10) Patent No.: US 12,706,662 B2
(45) Date of Patent: Aug. 11, 2026

(54) ROTATIONAL ALIGNMENT FOR MULTIPLE-INPUT MULTIPLE-OUTPUT DEVICES

(71) Applicant: QUALCOMM Incorporated, San Diego, CA (US)

(72) Inventors: Danlu Zhang, San Diego, CA (US); Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 17/859,950

(22) Filed: Jul. 7, 2022

(65) Prior Publication Data

US 2024/0014550 A1 Jan. 11, 2024

(51) Int. Cl.

*H04B 7/0413* (2017.01)
*H01Q 3/08* (2006.01)
*H04B 7/08* (2006.01)
*H04W 28/02* (2009.01)

(52) U.S. Cl.

CPC ......... *H04B 7/0814* (2013.01); *H04B 7/0413* (2013.01); *H04W 28/0215* (2013.01)

(58) Field of Classification Search

CPC .... H01Q 3/08; H04B 7/0413; H04W 25/0215
See application file for complete search history.

(56) References Cited

U.S. PATENT DOCUMENTS

2022/0107381 A1* 4/2022 Moon .................. H04B 7/0695

FOREIGN PATENT DOCUMENTS

| | | | | | |
|---|---|---|---|---|---|
| EP | 2106037 | A2 * | 9/2009 | ........... H04W 28/18 |
| JP | 2015231108 | A | 12/2015 | |
| JP | 2018037744 | A | 3/2018 | |
| WO | WO-2021077921 | A1 | 4/2021 | |
| WO | WO-2022160302 | A1 * | 6/2022 | |

OTHER PUBLICATIONS

WO-2021077921-A1 (Year: 2021).*

International Search Report and Written Opinion—PCT/US2023/067775—ISA/EPO—Aug. 29, 2023.

Tian H., et al., "Beam Axis Detection and Alignment for Uniform Circular Array-based Orbital Angular Momentum Wireless Communication", IET Communications, The Institution of Engineering and Technology, GB, vol. 10, No. 1, Jan. 1, 2016 pp. 44-49, XP006096524, ISSN: 1751-8628.

* cited by examiner

*Primary Examiner* — Muthuswamy G Manoharan
(74) *Attorney, Agent, or Firm* — Holland & Hart LLP

(57) ABSTRACT

Methods, systems, and devices for wireless communication are described. Some wireless communications systems may support rotational alignment of a first antenna panel of a first device and a second antenna panel of a second device. The first and second devices may exchange signaling that indicates a panel rotation capability and a panel rotation procedure configuration based on the panel rotation capability. The second device may transmit a reference signal from a central antenna element of the second antenna panel based on the configuration. The first device may receive the reference signal via two antenna elements of the first antenna panel and may adjust an angular rotation of the first antenna panel based on the reference signal to modify a respective distance between each of the two antenna elements of the first antenna panel relative to the central antenna element of the second antenna panel.

25 Claims, 17 Drawing Sheets

ROTATIONAL ALIGNMENT FOR MULTIPLE-INPUT MULTIPLE-OUTPUT DEVICES

FIELD OF TECHNOLOGY

The following relates to wireless communication, including rotational alignment for multiple-input multiple-output (MIMO) devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In multiple-input, multiple-output (MIMO) wireless communication scenarios, devices may communicate using antenna arrays to support relatively higher throughput. In some cases, devices may communicate using orbital angular momentum (OAM) multiplexing or rectangular antenna array multiplexing.

SUMMARY

The described techniques relate to improved methods, systems, devices, and apparatuses that support rotational alignment for multiple-input multiple-output (MIMO) devices. For example, the described techniques provide for a first wireless device to adjust an angular rotation of a first antenna panel at the first wireless device, such that the first antenna panel is aligned with a second antenna panel at a second wireless device. The first and second wireless devices may communicate signaling, such as one or more capability messages, that indicates that each of the first and second wireless devices support a panel rotation capability. That is, each of the first and second wireless devices may be capable of rotating a plane of a respective antenna panel around a central point of the antenna panel. The first and second wireless devices may, in some aspects, exchange a panel rotation procedure configuration for performing a panel rotation procedure. The second wireless device may transmit a reference signal using a central antenna element of the second antenna panel at the second wireless device based on the panel rotation procedure configuration.

The first wireless device may receive the reference signal via two antenna elements of the first antenna panel at the first wireless device. The two antenna elements may be referred to as an antenna element pair herein. The first wireless device may adjust an angular rotation of the first antenna panel to modify a respective distance between each of the two antenna elements of the first antenna panel relative to the central antenna element of the second antenna panel at the second wireless device. The first wireless device may transmit a message that indicates alignment feedback information for the first antenna panel and the second antenna panel. For example, the alignment feedback information may indicate whether the first antenna panel is perpendicular with respect to a line that connects a center of the first antenna panel and a center of the second antenna panel.

A method for wireless communication at a first wireless device is described. The method may include communicating signaling between the first wireless device and a second wireless device that indicates that each of the first wireless device and the second wireless device has a panel rotation capability, receiving, via a first set of two or more antenna elements of a set of multiple antenna elements of a first antenna panel of the first wireless device, a reference signal transmitted by a central antenna element of a second antenna panel of the second wireless device, adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device, and transmitting, to the second wireless device, a message indicating alignment feedback information for the first antenna panel and the second antenna panel.

An apparatus for wireless communication at a first wireless device is described. The apparatus may include a processor, memory coupled with the processor, and instructions stored in the memory. The instructions may be executable by the processor to cause the apparatus to communicate signaling between the first wireless device and a second wireless device that indicates that each of the first wireless device and the second wireless device has a panel rotation capability, receive, via a first set of two or more antenna elements of a set of multiple antenna elements of a first antenna panel of the first wireless device, a reference signal transmitted by a central antenna element of a second antenna panel of the second wireless device, adjust, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device, and transmit, to the second wireless device, a message indicating alignment feedback information for the first antenna panel and the second antenna panel.

Another apparatus for wireless communication at a first wireless device is described. The apparatus may include means for communicating signaling between the first wireless device and a second wireless device that indicates that each of the first wireless device and the second wireless device has a panel rotation capability, means for receiving, via a first set of two or more antenna elements of a set of multiple antenna elements of a first antenna panel of the first wireless device, a reference signal transmitted by a central antenna element of a second antenna panel of the second wireless device, means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device, and means for transmitting, to the second wireless device, a message indicating alignment feedback information for the first antenna panel and the second antenna panel.

A non-transitory computer-readable medium storing code for wireless communication at a first wireless device is described. The code may include instructions executable by a processor to communicate signaling between the first wireless device and a second wireless device that indicates that each of the first wireless device and the second wireless device has a panel rotation capability, receive, via a first set of two or more antenna elements of a set of multiple antenna elements of a first antenna panel of the first wireless device, a reference signal transmitted by a central antenna element of a second antenna panel of the second wireless device, adjust, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device, and transmit, to the second wireless device, a message indicating alignment feedback information for the first antenna panel and the second antenna panel.

Some examples of the method, apparatuses, and non-transitory computer-readable medium described herein may further include operations, features, means, or instructions for receiving a configuration message that includes a panel rotation procedure configuration based on the panel rotation capability, where receiving the reference signal may be based on the panel rotation procedure configuration.

In some examples of the method, apparatuses, and non-transitory computer-readable medium described herein, communicating the signaling may include operations, features, means, or instructions for transmitting a capability message indicating that the first wireless device supports the panel rotation capability, the panel rotation capability associated with a capability to adjust the angular rotation of the first antenna panel.

Some examples of the method, apparatuses, and non-transitory computer-readable medium described herein may further include operations, features, means, or instructions for receiving, via a second set of two or more antenna elements of the set of multiple antenna elements of the first antenna panel, a second reference signal transmitted by the central antenna element of the second wireless device. In some examples of the method, apparatuses, and non-transitory computer-readable medium described herein, adjusting the angular rotation of the first antenna panel may include operations, features, means, or instructions for adjusting, based on second measurements of the second reference signal at the second set of two or more antenna elements, the angular rotation of the first antenna panel to modify a respective second distance between each of the second set of two or more antenna elements of the first antenna panel relative to the central antenna element of the second antenna panel.

In some examples of the method, apparatuses, and non-transitory computer-readable medium described herein, transmitting the message may include operations, features, means, or instructions for transmitting, via the alignment feedback information, an indication that the first antenna panel may be perpendicular with respect to a line connecting a center of the first antenna panel and a center of the second antenna panel.

In some examples of the method, apparatuses, and non-transitory computer-readable medium described herein, transmitting the message may include operations, features, means, or instructions for transmitting, via the alignment feedback information, an indication that the first antenna panel may be not perpendicular with respect to a line connecting a center of the first antenna panel and a center of the second antenna panel.

Some examples of the method, apparatuses, and non-transitory computer-readable medium described herein may further include operations, features, means, or instructions for receiving, via the first set of two or more antenna elements of the set of multiple antenna elements of the first antenna panel, a second reference signal transmitted by the central antenna element of the second wireless device based on the alignment feedback information and adjusting, based on second measurements of the second reference signal at the first set of two or more antenna elements, the angular rotation of the first antenna panel to further modify the respective distance between each of the first set of two or more antenna elements of the first antenna panel relative to the central antenna element of the second antenna panel.

In some examples of the method, apparatuses, and non-transitory computer-readable medium described herein, transmitting the message may include operations, features, means, or instructions for transmitting, via the alignment feedback information, an indication that a difference between a first phase measurement at a first antenna element of the first set of two or more antenna elements and a second phase measurement at a second antenna element of the first set of two or more antenna elements satisfies a threshold.

In some examples of the method, apparatuses, and non-transitory computer-readable medium described herein, the first phase measurement may be based on a set of multiple first phase measurements of the reference signal received across one or more frequencies, across a set of one or more first antenna elements of the first antenna panel, or both, the set of one or more first antenna elements including the first antenna element of the first set of two or more antenna elements and the second phase measurement may be based on a set of multiple second phase measurements of the reference signal received across the one or more frequencies, across a set of one or more second antenna elements of the first antenna panel, or both, the set of one or more second antenna elements including the second antenna element of the first set of two or more antenna elements.

Some examples of the method, apparatuses, and non-transitory computer-readable medium described herein may further include operations, features, means, or instructions for comparing the first phase measurement, the second phase measurement, or both to a phase tolerance threshold, where adjusting the angular rotation of the first antenna panel may be based on the first phase measurement, the second phase measurement, or both satisfying the phase tolerance threshold.

Some examples of the method, apparatuses, and non-transitory computer-readable medium described herein may further include operations, features, means, or instructions for receiving, via at least a first non-central antenna element of the set of multiple antenna elements of the first antenna panel, one or more reference signals transmitted by one or more second non-central antenna elements of the second antenna panel of the second wireless device, determining, based on the one or more reference signals, a first angle between the first non-central antenna element and a first axis of the first antenna panel and a second angle between a second non-central antenna element of the one or more second non-central antenna elements of the second antenna panel and a second axis of the second antenna panel that may be parallel to the first axis, where the first non-central antenna element corresponds to the second non-central antenna element, and rotating the first antenna panel around a central point of the first antenna panel to adjust an angular difference between the first angle and the second angle.

Some examples of the method, apparatuses, and non-transitory computer-readable medium described herein may further include operations, features, means, or instructions for transmitting, to the second wireless device, a second message including second alignment feedback information that indicates whether the angular difference between the first angle and the second angle may be less than a threshold angular difference.

In some examples of the method, apparatuses, and non-transitory computer-readable medium described herein, each antenna element of the set of multiple antenna elements of the first antenna panel at the first wireless device may correspond to a respective second antenna element of a set of multiple second antenna elements of the second antenna panel at the second wireless device and rotating the first antenna panel may include modifying one or more angular differences between each pair of a respective first antenna element at the first wireless device and a respective second antenna element at the second wireless device.

Some examples of the method, apparatuses, and non-transitory computer-readable medium described herein may further include operations, features, means, or instructions for transmitting, via a central antenna element of the first antenna panel at the first wireless device, a second reference signal to the second wireless device and receiving, from the second wireless device, a second message indicating second alignment feedback information for the first antenna panel and the second antenna panel based on the second reference signal and a panel rotation procedure performed by the second wireless device.

In some examples of the method, apparatuses, and non-transitory computer-readable medium described herein, a first distance between two antenna elements of the first set of two or more antenna elements may be greater than or equal to a second distance between any other antenna elements of the set of multiple antenna elements within the first antenna panel.

In some examples of the method, apparatuses, and non-transitory computer-readable medium described herein, at least a subset of the set of multiple antenna elements may be disposed in a circular shape or a rectangular shape around a central antenna element of the first antenna panel. In some examples of the method, apparatuses, and non-transitory computer-readable medium described herein, the first wireless device and the second wireless device support orbital angular momentum (OAM) communications, line-of-site multiple-input multiple-output (LoS-MIMO) communications, or both.

A method for wireless communication at a second wireless device is described. The method may include communicating signaling between a first wireless device and a second wireless device that indicates that each of the first wireless device and the second wireless device has a panel rotation capability, communicating, with the first wireless device, a panel rotation procedure configuration based on the panel rotation capability, transmitting a reference signal via a central antenna element of a second antenna panel of the second wireless device based on the panel rotation procedure configuration, and receiving, by the second wireless device, a message indicating alignment feedback information for the second antenna panel of the second wireless device and a first antenna panel of the first wireless device based on the reference signal.

An apparatus for wireless communication at a second wireless device is described. The apparatus may include a processor, memory coupled with the processor, and instructions stored in the memory. The instructions may be executable by the processor to cause the apparatus to communicate signaling between a first wireless device and a second wireless device that indicates that each of the first wireless device and the second wireless device has a panel rotation capability, communicate, with the first wireless device, a panel rotation procedure configuration based on the panel rotation capability, transmit a reference signal via a central antenna element of a second antenna panel of the second wireless device based on the panel rotation procedure configuration, and receive, by the second wireless device, a message indicating alignment feedback information for the second antenna panel of the second wireless device and a first antenna panel of the first wireless device based on the reference signal.

Another apparatus for wireless communication at a second wireless device is described. The apparatus may include means for communicating signaling between a first wireless device and a second wireless device that indicates that each of the first wireless device and the second wireless device has a panel rotation capability, means for communicating, with the first wireless device, a panel rotation procedure configuration based on the panel rotation capability, means for transmitting a reference signal via a central antenna element of a second antenna panel of the second wireless device based on the panel rotation procedure configuration, and means for receiving, by the second wireless device, a message indicating alignment feedback information for the second antenna panel of the second wireless device and a first antenna panel of the first wireless device based on the reference signal.

A non-transitory computer-readable medium storing code for wireless communication at a second wireless device is described. The code may include instructions executable by a processor to communicate signaling between a first wireless device and a second wireless device that indicates that each of the first wireless device and the second wireless device has a panel rotation capability, communicate, with the first wireless device, a panel rotation procedure configuration based on the panel rotation capability, transmit a reference signal via a central antenna element of a second antenna panel of the second wireless device based on the panel rotation procedure configuration, and receive, by the second wireless device, a message indicating alignment feedback information for the second antenna panel of the second wireless device and a first antenna panel of the first wireless device based on the reference signal.

In some examples of the method, apparatuses, and non-transitory computer-readable medium described herein, communicating the signaling may include operations, features, means, or instructions for receiving a capability message indicating that the first wireless device supports the panel rotation capability, the panel rotation capability associated with a capability to adjust an angular rotation of the first antenna panel.

Some examples of the method, apparatuses, and non-transitory computer-readable medium described herein may further include operations, features, means, or instructions for transmitting, via the central antenna element of the second antenna panel of the second wireless device, a second reference signal.

In some examples of the method, apparatuses, and non-transitory computer-readable medium described herein, receiving the message may include operations, features, means, or instructions for receiving, via the alignment feedback information based on the reference signal, an indication that the first antenna panel may be not perpendicular with respect to a line connecting a center of the first antenna panel and a center of the second antenna panel, where transmitting the second reference signal may be based on the indication that the first antenna panel may be not perpendicular to the line.

In some examples of the method, apparatuses, and non-transitory computer-readable medium described herein, receiving the message may include operations, features, means, or instructions for receiving, via the alignment feedback information based on the reference signal, an indication that the first antenna panel may be perpendicular to a line connecting a center of the first antenna panel and a center of the second antenna panel.

In some examples of the method, apparatuses, and non-transitory computer-readable medium described herein, receiving the message may include operations, features, means, or instructions for receiving, via the alignment feedback information, an indication that a difference between a first phase measurement at a first antenna element of the first antenna panel of the first wireless device and a second phase measurement at a second antenna element of the first antenna panel of the first wireless device satisfies a threshold.

Some examples of the method, apparatuses, and non-transitory computer-readable medium described herein may further include operations, features, means, or instructions for transmitting, via one or more second non-central antenna elements of the second antenna panel, one or more reference signals, where each of the one or more second non-central antenna elements corresponds to a respective first non-central antenna element of a set of multiple first non-central antenna elements of the first antenna panel at the first wireless device and receiving, by the second wireless device, a second message including second alignment feedback information that indicates whether an angular difference between a first angle associated with a first non-central antenna element of the set of multiple first non-central antenna elements and a second angle associated with a second non-central antenna element of the one or more second non-central antenna elements may be less than a threshold angular difference, where the first angle may be between the first non-central antenna element and a first axis of the first antenna panel and the second angle may be between the second non-central antenna element of the second antenna panel and a second axis of the second antenna panel that may be parallel to the first axis, and where the first non-central antenna element corresponds to the second non-central antenna element.

Some examples of the method, apparatuses, and non-transitory computer-readable medium described herein may further include operations, features, means, or instructions for receiving, via a set of two or more antenna elements of the second antenna panel of the second wireless device, a second reference signal transmitted by a central antenna element of the first antenna panel of the first wireless device, adjusting, based on measurements of the second reference signal at the set of two or more antenna elements, an angular rotation of the second antenna panel to modify a respective distance between each of the set of two or more antenna elements of the second antenna panel relative to the central antenna element of the first antenna panel, and transmitting, to the first wireless device, a second message indicating second alignment feedback information for the first antenna panel and the second antenna panel based on adjusting the angular rotation of the second antenna panel.

DETAILED DESCRIPTION

Figure 1:
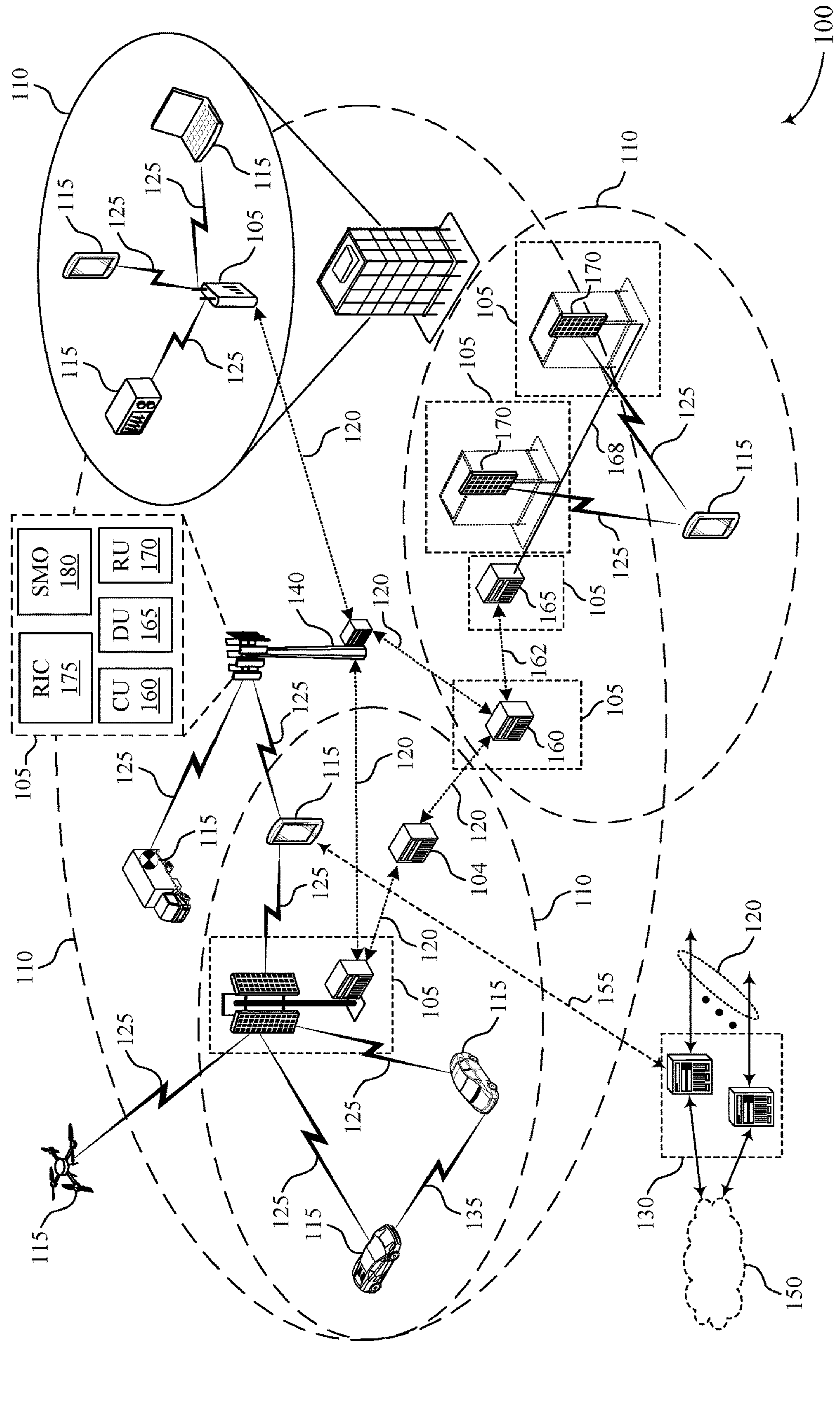
FIG. 1 illustrates an example of a wireless communications system that supports rotational alignment for multiple-input multiple-output (MIMO) devices in accordance with one or more aspects of the present disclosure.

Various wireless communication schemes, such as line-of-site multiple-input multiple-output (LoS-MIMO), are being considered for advanced wireless communication systems (for example, 6G wireless communication systems) to, for example, support relatively high throughput over short distances. In such environments, two wireless devices may communicate using one or more antenna arrays. For example, each of the wireless devices may include an orbital angular momentum (OAM) antenna system having multiple antenna elements arranged in one or more concentric circular antenna arrays, or an antenna system having one or more rectangular antenna arrays, or some other shape of antenna arrays. The antenna arrays including antenna elements may be referred to as antenna panels herein. The respective antenna panels of the two wireless devices may be installed such that they are aligned along a first axis (e.g., a horizontal axis or a vertical axis) as well as rotationally (e.g., such that respective antenna elements of an antenna panel of one wireless device are aligned with respective antenna elements of an antenna panel of the other wireless device in various rotational axes). It is important that the two antenna panels are aligned to support wireless communication, such as LoS-MIMO, regardless of the type of antenna panels implemented, for example, whether OAM arrays or rectangular arrays are used. With any misalignment (e.g., axial misalignment or rotational misalignment) between respective antenna panels of two wireless devices, modes in OAM or LoS-MIMO between the wireless devices may lose orthogonality, which may result in signal loss, among other disadvantages.

Various aspects generally relate to a transmitting device and a receiving device communicating according to a wireless communications scheme, such as a LoS-MIMO scheme, and more specifically, to the devices performing dynamic panel rotation procedures to align respective antenna panels at the devices. In some cases, devices may communicate using orbital angular momentum (OAM) multiplexing or rectangular antenna array multiplexing. In these environments, it may be beneficial for two antenna arrays to be aligned in order to support orthogonality of related signaling.

To perform the panel rotation procedures, the two devices may each support a panel rotation capability to adjust an angular rotation of an antenna panel around a central point of the antenna panel. The devices may exchange capability messages that indicate the panel rotation capability. A transmitting device may transmit a panel rotation procedure configuration that initiates a panel rotation procedure and indicates misalignment between a first antenna panel at the receiving device and a second antenna panel at the transmitting device. The configuration may indicate scheduling information for one or more reference signals.

The transmitting device may transmit the one or more reference signals from a central antenna element of the second antenna panel at the transmitting device. The receiving device may receive the reference signals and measure phase information at one or more pairs of antenna elements of the first antenna panel at the receiving device. The receiving device may adjust an angular rotation of the first antenna panel around an axis that intersects the antenna elements such that respective distances between the antenna elements at the receiving device and the central antenna element at the transmitting device may be within a threshold difference of each other. The receiving device may perform similar adjustments using pairs of antenna elements on one or more other axes of the first antenna panel. The transmitting device may perform similar panel rotation adjustments for the second antenna panel relative to a central antenna element of the first antenna panel.

The devices may exchange alignment feedback information based on the adjustments. For example, after adjusting the angular rotation of the first antenna panel, the receiving device may transmit alignment feedback information to the transmitting device to indicate that the first panel is aligned or misaligned with a common axis that intersects the central antenna element of the second antenna panel and the central antenna element of the first antenna panel. Alignment with the common axis may indicate that a plane of the first antenna panel is perpendicular to the common axis or within a threshold angular range. In some aspects, the receiving device may determine whether the first antenna panel is aligned based on distances calculated from relative phase measurements at two or more antenna elements of the receiving device. The transmitting device may transmit alignment feedback information to the receiving device to indicate a result of a similar panel rotation procedure at the transmitting device. If either device indicates negative alignment feedback information, the device may receive one or more additional reference signals to assist with further aligning the antenna panel.

Once the planes of the antenna panels are aligned (e.g., perpendicular to a common axis that intersects centroids of both antenna panels), the devices may align corresponding antenna elements with one another. For example, each antenna element at the transmitting device may correspond to a respective antenna element at the receiving device. One or both of the devices may rotate a respective antenna panel around a central point or the common axis such that an angular offset between one or more first antenna elements at the receiving device and one or more corresponding second antenna elements at the transmitting device is less than a threshold offset. The devices may exchange one or more second reference signals to determine the angles of each antenna element. In some aspects, the devices may exchange second alignment feedback information to assist with aligning the antenna elements. A wireless device may thereby perform a panel rotation procedure to adjust an angular rotation of a respective antenna panel to be aligned with an antenna panel at a second wireless device, which may improve reliability and throughput of communications while reducing complexity as compared to some other alignment techniques.

Aspects of the disclosure are initially described in the context of wireless communications systems. Additional aspects are described with reference to antenna panel configurations and a process flow. Aspects of the disclosure are further illustrated by and described with reference to apparatus diagrams, system diagrams, and flowcharts that relate to rotational alignment for MIMO devices.

FIG. 1 illustrates an example of a wireless communications system 100 that supports rotational alignment for MIMO devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being anode. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support rotational alignment for MIMO devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, two wireless devices in the wireless communications system 100 may dynamically adjust or modify an angular rotation of respective antenna panels at the devices to align the antenna panels for efficient and reliable wireless communications. The techniques described herein may be implemented by first and second wireless devices to align/compensate for misalignment between a first antenna panel at the first wireless device and a second antenna panel at a second wireless device. The first and second wireless devices may represent examples of any type of wireless devices described herein. Accordingly, the techniques described herein may be applied for UE-to-UE, network entity-to-network entity, UE-to-network entity or network entity-to-UE antenna panel alignment/compensation between the first antenna panel and the second antenna panel, or both The first and second wireless devices may communicate signaling, such as one or more capability messages, that indicates that each of the first and second wireless devices support a panel rotation capability. That is, each of the first and second wireless devices may be capable of rotating a plane of a respective antenna panel around a central point of the antenna panel. The first and second wireless devices may, in some aspects, exchange a panel rotation procedure configuration for performing a panel rotation procedure. The second wireless device may transmit a reference signal using a central antenna element of the second antenna panel at the second wireless device based on the panel rotation procedure configuration.

The first wireless device may receive the reference signal via two antenna elements of the first antenna panel at the first wireless device. The two antenna elements may be referred to as an antenna element pair herein. The first wireless device may adjust an angular rotation of the first antenna panel to modify a respective distance between each of the two antenna elements of the first antenna panel relative to the central antenna element of the second antenna panel at the second wireless device. The first wireless device may transmit a message that indicates alignment feedback information for the first antenna panel and the second antenna panel. For example, the alignment feedback information may indicate whether the first antenna panel and the second antenna panel are aligned or misaligned.

Figure 2:
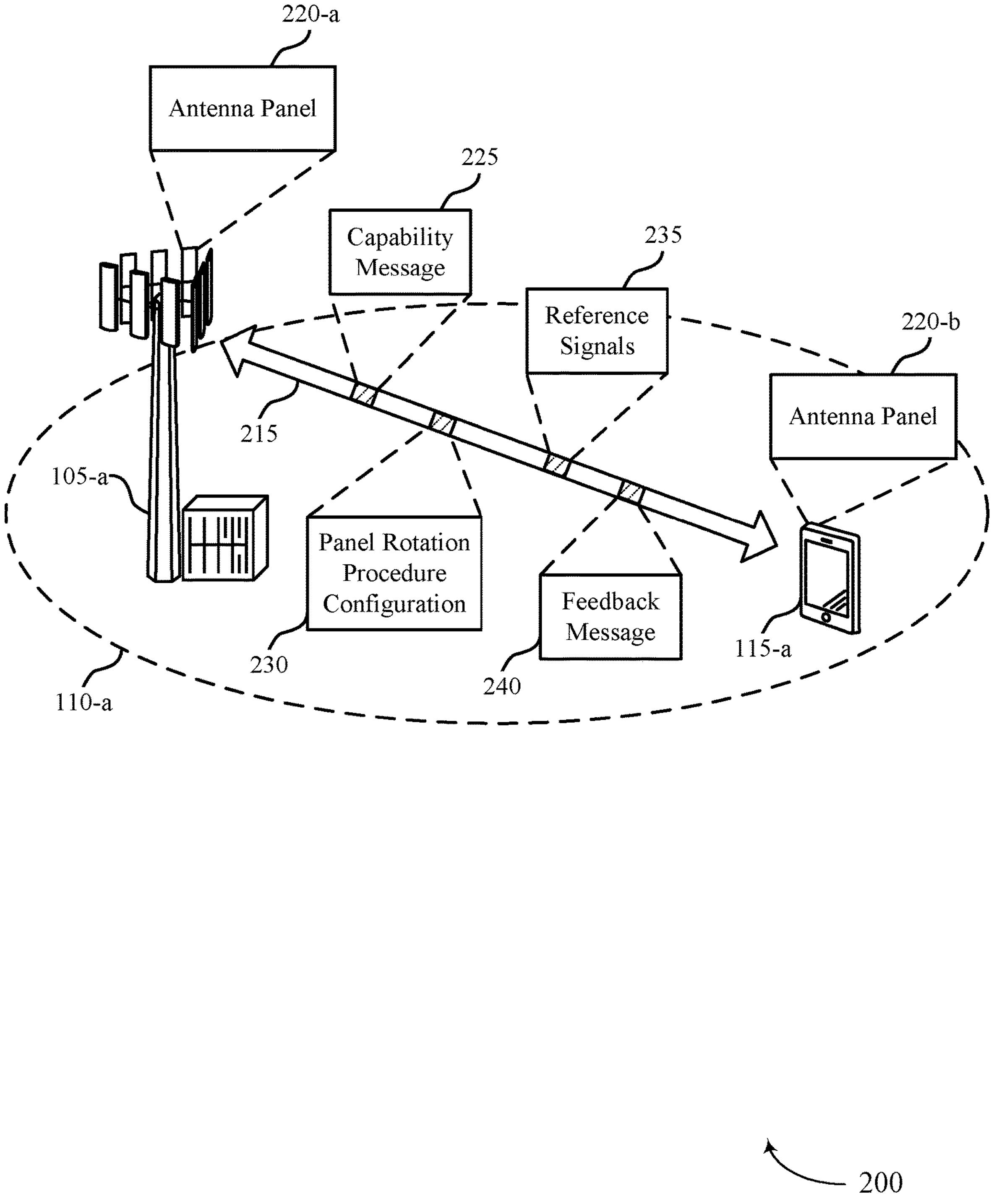
FIG. 2 illustrates an example of a wireless communications system that supports rotational alignment for MIMO devices in accordance with one or more aspects of the present disclosure.

FIG. 2 illustrates an example of a wireless communications system 200 that supports rotational alignment for MIMO devices in accordance with one or more aspects of the present disclosure. The wireless communications system 200 may implement or be implemented by aspects of the wireless communications system 100 as described with reference to FIG. 1. For example, the wireless communications system 200 may include a network entity 105-*a* and a UE 115-*a*, which may represent examples of a network entity 105 and a UE 115 as described with reference to FIG. 1. The network entity 105-*a* may communicate with the UE 115-*a* within a geographic coverage area 110-*a* and via a communication link 215 (e.g., a Uu link).

As discussed herein, the wireless communications system 200 may be configured to support one or more LoS-MIMO schemes, such as OAM, to increase throughput over a short distance LoS deployment scenario. These deployment scenarios may include an antenna panel 220 being installed, established, or otherwise configured at two or more wireless devices, such as the UE 115-*a*, the network entity 105-*a*, or one or more other types of devices, such that each antenna panel 220 is coplanar with respect to the other antenna panel 220. In some aspects, an antenna panel 220 at a transmitting device may be referred to as a transmit antenna panel 220 and an antenna panel 220 at a receiving device may be referred to as a receive antenna panel 220.

An antenna panel 220 may represent an example of an antenna array, or the antenna panel 220 may include multiple antenna arrays, or both. For example, each antenna panel 220 may include an array of one or more antenna elements. Each antenna panel 220 may have a circular shape (e.g., for OAM), a rectangular shape, an oval shape, a square shape, among other examples. The antenna elements of the antenna panel 220 may be disposed around a central antenna element or a central point (e.g., a centroid) of the antenna panel 220 (e.g., along a perimeter of the shape, within the shape, or both). The antenna elements may be disposed on a plane or a planar face of the antenna panel (e.g., a two-dimensional shape). Alignment of a receiving plane to a transmitting plane, for example, alignment of a planar face of the antenna panel 220-*a* and the antenna panel 220-*b*, may be relatively important for LoS MIMO schemes, regardless of whether OAM (e.g., concentric circles) or rectangular antenna arrays are used. Without such alignment, the modes in OAM and LoS-MIMO may lose orthogonality with respect to each other, thus disrupting communications.

Misalignment of a first antenna panel 220 at a first device and a second antenna panel 220 at a second device may be relatively common (at least initially), and therefore an alignment procedure may be necessary before communications sessions are established between the first device (e.g., the UE 115-*a*) and the second device (e.g., the network entity 105-*a*). Misalignment in some scenarios may include a linear offset (e.g., linear off-axis) in which the planar face of the antenna panels may be offset along a Z-axis, as well as rotational offset(s) in which the planar face of the antenna arrays or panels may be rotated around the Z-axis or the planar face of one antenna panel 220 may be tilted or otherwise leans such that it is not parallel to the planar face of the other antenna panel 220. Accordingly, various degrees of freedom be present in the misalignment of the antenna panels 220 corresponding to the linear axis or the rotational offset(s) or both. If such misalignment is present, the transformation matrix may include numerous variables that are tangled together, which may make it relatively difficult to analyze or correct (or both) for the misalignment between the first antenna panel 220 and the second antenna panel 220. Examples of such misalignment are illustrated and described in further detail with reference to FIGS. 3-5.

In some cases, one or more wireless devices may be deployed or installed with stationary antenna panels 220. In such cases, the antenna panels 220 may be installed such that the planar face of a transmit antenna panel 220 is coplanar with respect to a planar face of a receive antenna panel 220 along a Z-axis, and are rotated such that each antenna element is aligned with a corresponding antenna element of the receive antenna panel 220 along an X- and Y-axis (e.g., are rotated similarly around the Z-axis). This may support Fresnel diffraction, which may be key to the presence of multiple channels supporting the MIMO communications with LoS. In some cases, if an antenna panel 220 is stationary at a first device but an antenna panel 220 can be adjusted by a second device in communication with the first device, the second device may physically adjust a linear position as well as an orientation of an antenna panel 220 at the second device to be aligned with a plane of an antenna panel 220 at the first device, which may result in relatively high complexity and overhead. The position adjustment by the second device may be necessary due to the antenna panel 220 at the first device being fixed.

Techniques, systems, and devices are described herein to provide for antenna panels 220 at transmit and receive devices to be installed, configured, adjusted, and/or deployed, such that a first device may align a plane of a respective antenna panel 220 with a plane of a second antenna panel 220 at a second device with which the first device is to communicate using angular adjustments (e.g., an refraining from applying physical or linear adjustments). The wireless devices described herein may support dynamic panel rotation adjustment procedures. For example, the UE 115-*a* and the network entity 105-*a* may each support a panel rotation adjustment capability, which may correspond to a capability of adjusting a rotational angle of an antenna panel 220 at the respective device around one or more axes or central points of the antenna panel 220. By performing such angular adjustments, the devices may refrain from shifting a central point or axis of the antenna panel 220 in a linear direction.

In the example of FIG. 3, the UE 115-*a* and the network entity 105-*a* may each be equipped with an antenna panel 220-*a* and an antenna panel 220-*b*, respectively. The UE 115-*a* and the network entity 105-*a* may initiate wireless communications via the communication link 215 using the antenna panels 220-*a* and 220-*b* (e.g., LoS-MIMO communications). In some aspects, a planar face of the antenna panel 220-*a* at the network entity 105-*a* may be misaligned with a planar face of the antenna panel 220-*b* at the UE 115-*a*. As such, the devices may adjust an angular rotation of one or both of the antenna panels 220 to achieve reliable and efficient LoS-MIMO communications. In some aspects, the devices may exchange one or more messages or signals that indicate the misalignment between the antenna panels 220.

As described herein, the devices may exchange signaling to indicate a panel rotation capability. For example, the UE 115-*a* may transmit a first capability message 225 and the network entity 105-*a* may transmit a second capability message 225. Once the devices are aware that both devices are capable of adjusting an angular rotation of a plane of an antenna panel 220 around a central point of the antenna panel 220, the devices may communicate a panel rotation procedure configuration 230 to initiate a panel rotation procedure to align the antenna panels. In some aspects, the panel rotation procedure configuration 230 may be transmitted by one of the devices (e.g., a transmitting device) or each device may transmit a respective panel rotation procedure configuration 230. The panel rotation procedure configuration 230 may be transmitted via a control message, such as an RRC message, a medium access control-control element (MAC-CE), downlink control information (DCI), uplink control information (UCI), sidelink control information (SCI) (e.g., if exchanged between two UEs 115), or some other type of control message or control signaling.

The panel rotation procedure configuration 230 may indicate misalignment between the antenna panels 220, may initiate the panel rotation procedures, or both. Additionally, or alternatively, the panel rotation procedure configuration 230 may indicate scheduling information for scheduling one or more reference signals 235 associated with the panel rotation procedures. For example, the network entity 105-*a* may transmit a configuration message to the UE 115-*a* that includes, in the panel rotation procedure configuration 230, scheduling information for at least a first reference signal 235. The network entity 105-*a* may subsequently transmit the first reference signal 235 to the UE 115-*a* from a central antenna element of the antenna panel 220-*a* based on the scheduling information indicated via the panel rotation procedure configuration 230. The UE 115-*a* may receive the first reference signal 235 at two or more antenna elements of the antenna panel 220-*b* based on the panel rotation procedure configuration 230.

To perform the panel rotation procedure, the UE 115-*a* adjust an angular rotation of a plane of the antenna panel 220-*b* to modify a respective distance between each of the two or more antenna elements relative to the central antenna element of the antenna panel 220-*a* at the network entity 105-*a* based on measurements of the first reference signal 235. In some aspects, the UE 115-*a* may obtain measurements of each reference signal 235 at a respective pair of antenna elements of the antenna panel 220-*b*. Each pair of antenna elements may include first and second antenna elements that may be located on an axis of a plane of the antenna panel 220-*b*, such that the axis may intersect the first antenna element, the second antenna element, and a centroid of the antenna panel. In some aspects (e.g., if the antenna panel 220-*b* is circular), a distance between the first antenna element and the second antenna element of a given pair of antenna elements may be greater than a distance between the first antenna element and any other antenna element on the antenna panel 220-*b*.

The measurements of a reference signal 235 may include phase measurements of reference signal 235 at the respective antenna elements. For example, the UE 115-*a* may measure a first phase of the reference signal 235 at a first antenna element of an antenna element pair and a second phase of the first reference signal 235 at a second antenna element of the antenna element pair. The UE 115-*a* may calculate a phase difference between the first phase measurement at the first antenna element and the second phase measurement at the second antenna element. The UE 115-*a* may use the phase difference to adjust an angular rotation of a plane of the antenna panel 220-*b*. For example, the phase difference may be indicative of a difference between two respective distances between the first and second antenna elements and the central antenna element of the antenna panel 220-*a* at the network entity 105-*a*. That is, the UE 115-*a* may adjust the angular rotation of the antenna panel 220-*a* to equalize the two respective distances. Algorithms for reducing respective distances between antenna element pairs are described in further detail elsewhere herein, including with reference to FIG. 4.

The UE 115-*a* may transmit a feedback message 240 including alignment feedback information based on adjusting the rotational angle of the antenna panel 220-*b*. The feedback message 240 may include positive or negative alignment feedback information that indicates that the antenna panel 220-*b* is aligned with the antenna panel 220-*a* or misaligned with the antenna panel 220-*a*, respectively. In some aspects, the UE 115-*a* may indicate, via the alignment feedback information, a relative phase difference between an antenna element pair, or indicate whether the relative phase difference satisfies a threshold (e.g., whether the antenna elements of the antenna element pair are aligned).

Positive alignment feedback information may indicate that the plane of the antenna panel 220-*b* is aligned with (e.g., perpendicular to) a common axis that intersects a centroid of the antenna panel 220-*a* at the network entity 105-*a* and a centroid of the antenna panel 220-*b* at the UE 115-*a*. Negative alignment feedback information may indicate that the plane of the antenna panel 220-*b* is not aligned with (e.g., perpendicular to) the common axis. If the network entity 105-*a* receives negative alignment feedback information, the network entity 105-*a* may transmit one or more second reference signals 235 to assist with further adjustments of the antenna panel 220-*b*. The UE 115-*a* may adjust the angular rotation of the antenna panel 220-*b* based on measurements of the second reference signals 235 at the antenna element pair to further modify respective distances between the antenna elements and the central antenna element of the antenna panel 220-*a*.

In some aspects, the UE 115-*a* may transmit alignment feedback information in response to each reference signal 235 received from the network entity 105-*a*. For example, each time the UE 115-*a* adjusts the rotational angle of the antenna panel 220-*b* based on relative phase measurements of a reference signal 235 at a pair of antenna elements, the UE 115-*a* may transmit a feedback message 240. In such cases, the alignment feedback information may indicate alignment of the plane of the antenna panel 220-*b* with respect to an axis that intersects the pair of the antenna elements. For example, if a relative phase difference between an antenna element pair is greater than the threshold, the UE 115-*a* may determine that respective distances between each of the antenna elements in the pair and the central antenna element of the antenna panel 220-*a* are not the same, and the axis is not aligned. The UE 115-*a* may transmit negative alignment feedback information to request additional reference signals 235 for adjusting the rotational angle of the antenna panel 220-*b* with respect to the axis until the axis is aligned, at which point the UE 115-*a* may begin adjusting the antenna panel 220-*b* with respect to a second axis.

Additionally, or alternatively, the UE 115-*a* may transmit the feedback message 240 after a quantity of two or more reference signals 235 and corresponding adjustments, after two or more axes of the antenna panel 220-*b* are perpendicular to the common axis, or both. The UE 115-*a* may thereby perform a panel rotation procedure based on measurements of one or more reference signals 235 to align the antenna panel 220-*b* with the common axis.

The network entity 105-*a* may perform a similar panel rotation procedure before, after, or at the same time as the panel rotation procedure is performed by the UE 115-*a*. For example, the UE 115-*a* may transmit one or more reference signals 235 from a central antenna element of the antenna panel 220-*b* at the UE 115-*a*. In some aspects, the UE 115-*a* may transmit a panel rotation procedure configuration 230 that schedules the one or more reference signals 235, or the one or more reference signals 235 transmitted by the UE 115-*a* may be configured based on the panel rotation procedure configuration 230 transmitted by the network entity 105-*a*.

The network entity 105-*a* may receive the reference signals 235 and adjust an angular rotation of a plane of the antenna panel 220-*a* based on measurements of the reference signals at one or more antenna element pairs of the antenna panel 220-*a*. The network entity 105-*a* may transmit feedback messages 240 to the UE 115-*a* to indicate positive or negative alignment feedback information based on the panel rotation procedure. Because the reference signals 235 are transmitted by a central antenna element and received at one or more non-central antenna elements of each antenna panel 220, the devices may, in some aspects, perform the panel rotation procedures at least partially concurrently. Additionally, or alternatively, the devices may perform the panel rotation procedures in a sequential order. For example, the UE 115-*a* may adjust the angular rotation of the antenna panel 220-*b* and the network entity 105-*a* may subsequently adjust the angular rotation of the antenna panel 220-*a* once the antenna panel 220-*b* is aligned (e.g., after receiving positive alignment feedback information), or vice versa.

In some aspects, after the antenna panel 220-*a* and the antenna panel 220-*b* are both aligned (e.g., perpendicular to the common axis), the UE 115-*a* and the network entity 105-*a* may further align corresponding antenna elements of the antenna panels 220. For example, the UE 115-*a*, the network entity 105-*a*, or both may rotate a plane of a respective antenna panel 220 around the common axis to align corresponding antenna elements, as described in further detail with reference to FIG. 5. The devices may align the corresponding antenna elements based on the measurements of the previously transmitted reference signals 235, based on measurements of one or more additional reference signals 235, or both. In some aspects, the devices may exchange one or more additional feedback messages 240 including additional alignment feedback information that indicates a result of the alignment between corresponding antenna elements.

The techniques described herein may thereby be implemented by the UE 115-*a* and the network entity 105-*a* to align/compensate for misalignment between the antenna panel 220-*a* and the antenna panel 220-*b*. The described techniques may provide for improved reliability and throughput, while reducing complexity as compared with other alignment techniques in which physical or linear adjustments of an antenna panel 220 may be required. Although the UE 115-*a* and the network entity 105-*a* are illustrated as performing the panel rotation procedures in FIG. 2, it is to be understood that the techniques described herein may be applied by any combination of wireless devices that are equipped with antenna panels 220. For example, the described techniques may be applied for UE-to-UE (e.g., V2X, sidelink), network entity-to-network entity (e.g., backhaul), UE-to-network entity or network entity-to-UE (e.g., Uu) communications, or any combination thereof. Further details of alignment between antenna panels 220 are described with reference to FIGS. 3-6.

Figure 3A:
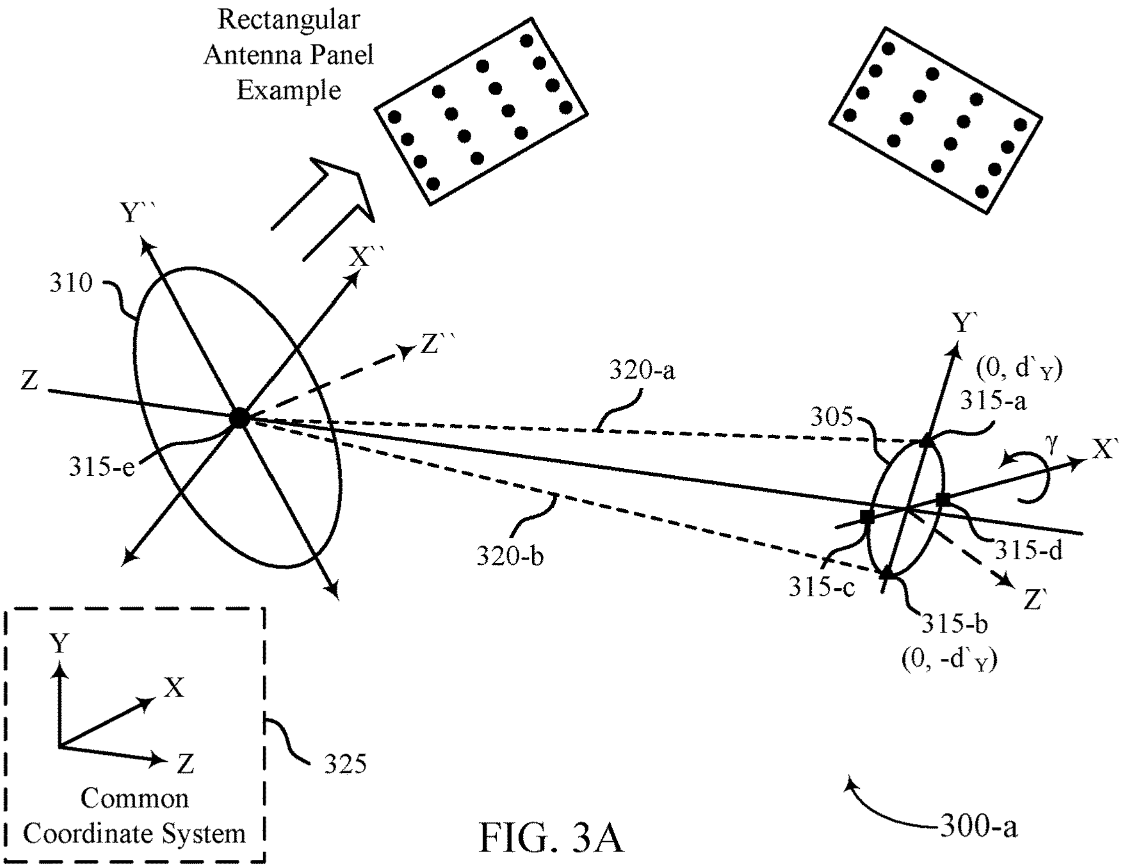
FIGS. 3A and 3B illustrate examples of antenna panel configurations that support rotational alignment for MIMO devices in accordance with one or more aspects of the present disclosure.
Figure 3B:
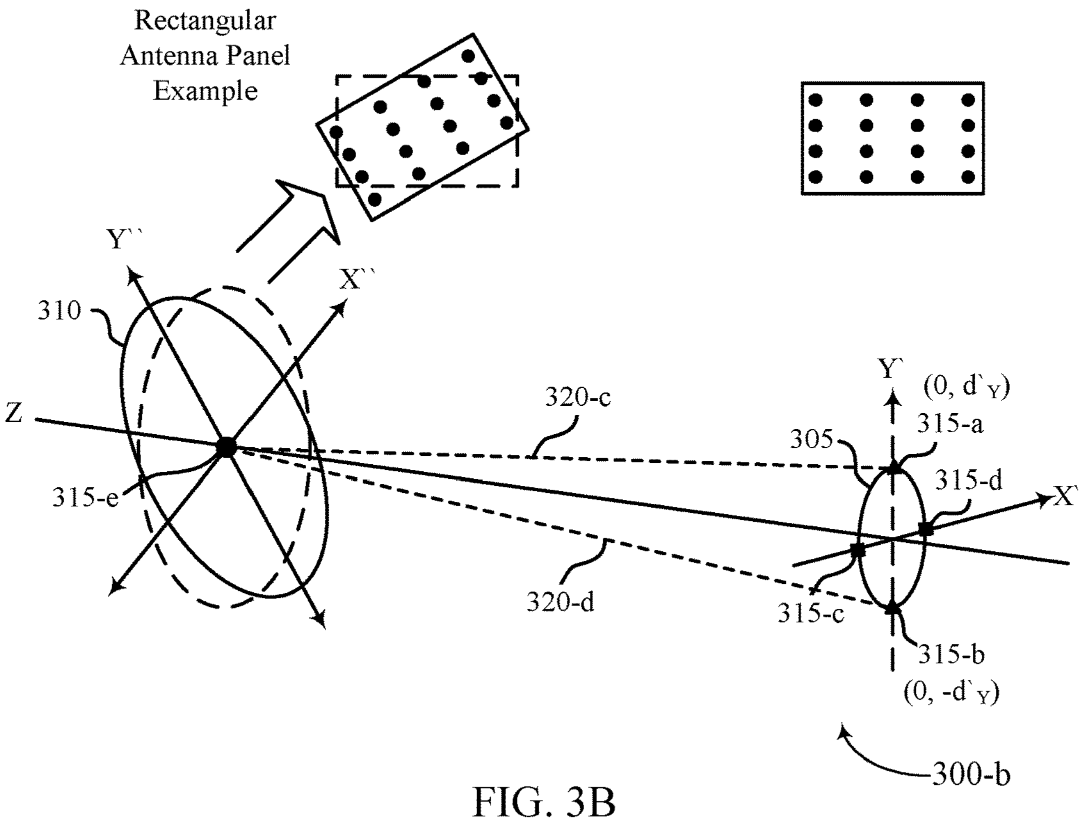

FIGS. 3A and 3B illustrate examples of antenna panel configurations 300 that support rotational alignment for MIMO devices in accordance with one or more aspects of the present disclosure. In some aspects, the antenna panel configurations 300 may implement aspects of wireless communications systems 100 or 200. In this example, the antenna panel configurations 300 may include a first antenna panel 305 associated with a first device (e.g., a receiving device) and a second antenna panel 310 associated with a second device (e.g., a transmitting device). The first and second devices may represent examples of wireless devices as described with reference to FIGS. 1 and 2. For example, each of the first and second devices may represent an example of a UE, a base station, an RU, a DU, a CU, an IAB node or some other device.

The first antenna panel 305 and the second antenna panel 310 may each include one or more antenna elements 315. In the example of FIGS. 3A and 3B, the first antenna panel 305 at the first device may include at least four antenna elements 315-*a*, 315-*b*, 315-*c*, and 315-*d*. The second antenna panel 310 at the second device may include at least one antenna element 315-*e*, which may be located at or near a centroid of the antenna panel 310. The antenna element 315-*e* may be referred to as a central antenna element 315-*e* herein. Although five antenna elements 315 are illustrated across the antenna panels 305 and 310 in FIGS. 3A and 3B, it is to be understood that the first antenna panel 305 and the second antenna panel 310 may each include any quantity of one or more antenna elements 315 that may be located at any position within or on the respective antenna panel.

The first antenna panel 305 and the second antenna panel 310 may be any shape of antenna panels. Examples of rectangular antenna panels are illustrated in FIGS. 3A and 3B in addition to the circular antenna panels 305 and 310. Additionally, or alternatively, antenna elements 315 of an antenna panel may be disposed in any other shape, such as an ellipse, a square, a triangle, a spiral, or some other shape.

As described with reference to FIG. 2, the devices may perform LoS MIMO communications using the antenna elements 315. However, misalignment between the first antenna panel 305 and the second antenna panel 310 may reduce reliability and increase complexity of LoS MIMO communications. The misalignment may include a linear offset, one or more rotational or angular offsets, or both between the antenna panel 305 and the antenna panel 310. For example, a transmission from a center antenna element 315-*e* of the second antenna panel 310 may not align with a corresponding center antenna element 315 of the first antenna panel 305. One or more other transmissions between pairs of corresponding antenna elements 315 at the first and second devices may also not align.

One example of such misalignment is illustrated in the antenna panel configuration 300-*a* of FIG. 3A. Each of the antenna panel 305 and the antenna panel 310 may include a respective planar face corresponding to a respective coordinate system. In this example, the antenna panel 305 may initially be oriented according to the X', Y', and Z' coordinate system illustrated in FIG. 3A, such that the planar face of the antenna panel 305 may extend in the X' and Y'-axes and may be perpendicular to the Z'-axis. The antenna panel 310 may initially be oriented according to the X", Y", and Z' coordinate system illustrated in FIG. 3A, such that the planar face of the antenna panel 310 may extend in the X" and Y'-axes and may be perpendicular to the Z"-axis. One or more of the X", Y", and Z"-axes of the planar face of the second antenna panel 310 may be misaligned with (e.g., non-parallel to, having a non-zero angular offset from) the X', Y', and Z'-axes of the planar face of the first antenna panel 305.

In the example of FIG. 3A, misalignment between the Y'-axis and the Y'-axis may be shown by a difference between respective distances 320-*a* and 320-*b* between the pair of antenna elements 315-*a* and 315-*b* positioned on the Y'-axis relative to the central antenna element 315-*e* of the second antenna panel 310. For example, a first distance 320-*c* between the antenna element 315-*a* and the central antenna element 315-*e* may be different than a second distance 320-*d* between the antenna element 315-*b* and the central antenna element 315-*e*. The difference may indicate that the Y'-axis of the first antenna panel 305 is misaligned with the Y"-axis of the second antenna panel 310.

Techniques described herein provide for the first device and the second device to dynamically adjust an angular rotation of the antenna panel 305 and the antenna panel 310, respectively, such that the antenna panel 305 and the antenna panel 310 are aligned according to a same coordinate system (e.g., or at least according to coordinate systems within a threshold angular offset of each other). As described with reference to FIG. 2, the first device and the second device may each support a panel rotation capability to adjust an angular rotation of an antenna panel around one or more axes that intersect a central point of the antenna panel. The devices may utilize the panel rotation capability to perform a panel rotation procedure to align respective planes of the first antenna panel 305 and the second antenna panel 310.

To perform the panel rotation procedure described herein, the first device, the second device, or both, may find a line connecting a center (e.g., a centroid, central point, or central antenna element 315) of the transmit and receive planes. This line may serve as the Z-axis for a common coordinate system 325 between the antenna panels at the two devices. In some aspects, rectangular coordinates may be used for panel rotation algorithms, but the results may be applicable to OAM and polar coordinates. In the example of FIG. 3A, the common Z-axis may intersect the central antenna element 315-*e* of the second antenna panel 310 at the second device and a central antenna element 315 of the first antenna panel 305 at the first device (not illustrated in FIG. 3A). The alignment method described herein (e.g., the antenna panel rotation procedure) may include rotating the transmit antenna panel 310 and the receive antenna panel 305 to make them both perpendicular to the Z-axis. After the panel rotation procedure is performed, the antenna panel 305 and the antenna panel 310 may be aligned. That is, a plane of the antenna panel 310 and a plane of the antenna panel 305 may both extend in the common X and Y-axes and may both be perpendicular to the common Z-axis.

In some aspects, the angular rotation of an antenna panel at each device may occur in one or more stages (e.g., portions, phases, or steps). For example, the device may adjust an angular rotation of a plane of the antenna panel relative to a first axis (e.g., the Y'-axis) in a first stage of the panel rotation procedure, and the device may adjust an angular rotation of the plane of the antenna panel relative to a second axis (e.g., the X'-axis) in a second stage of the panel rotation procedure that is subsequent to the first stage in time, prior to the first stage in time, at least partially overlapping with the first stage in time, or any combination thereof. To align a given axis with the common coordinate system 325, the device may equalize respective distances between a pair of antenna elements 315 positioned on the axis.

FIG. 3B illustrates an antenna panel configuration 300-*b* the antenna panel 305 is rotated around at least the X'-axis during the panel rotation procedure. As illustrated in FIG. 3B, the first device may adjust an angular rotation of the antenna panel 305 around the X'-axis (which may be the same as or different than the X-axis of the common coordinate system 325) to modify a respective distance 320 between each antenna element 315 of the pair of antenna elements 315-*a* and 315-*b* positioned on the Y'-axis relative to the central antenna element 315-*e* of the second antenna panel 310. For example, the first device may adjust the angular rotation of the antenna panel 305 around the X'-axis until a difference between the first distance 320-*c* between the antenna element 315-*a* and the central antenna element 315-*e* and the second distance 320-*d* between the antenna element 315-*b* and the central antenna element 315-*e* is less than a threshold difference (e.g., the distances 320-*c* and 320-*d* are equalized).

The panel rotations may be based on the measurement of relative phases at one or more pairs of transmit and receive antenna elements 315. For example, as described with reference to FIG. 2, the first and second devices may exchange one or more reference signals to facilitate the panel rotation procedure. A reference signal may be transmitted from a center transmit antenna element 315-*e* at the second device (e.g., a transmitting device in the example of FIG. 3), and the first device (e.g., a receiving device in the example of FIG. 3) may perform a channel estimation at one or more pairs of antenna elements 315 based on the reference signal.

The first device may receive the reference signal at the pair of antenna elements 315-*a* and the antenna element 315-*b* on the Y'-axis. In some aspects, the first device may receive the reference signal at one or more other antenna elements 315, but the first device may refrain from processing or measuring the reference signal at the one or more other antenna elements 315. The first device may perform a channel estimation at the antenna element 315-*a* and the antenna element 315-*b* to estimate a relative phase difference between a first phase at the antenna element 315-*a* and a second phase at the antenna element 315-*b*. The first device may adjust the angular rotation of the antenna panel 305 around the X'-axis based on the relative phase to ensure that a difference between the modified distances 320-*c* and 320-*d* is less than a threshold. Algorithms for performing the panel rotation procedure to rotate the antenna panel 305 around one or more axes are described with reference to FIG. 4B.

The first device may thereby adjust an angular rotation of the antenna panel 305 around the X'-axis based on measurements of a reference signal at one or more pairs of antenna elements 315 that are located or positioned on the Y'-axis, such as the antenna elements 315-*a* and 315-*b*. The first device may transmit alignment feedback information to indicate whether the rotation around the X'-axis is successful or not. For example, the alignment feedback information may indicate a whether a relative phase difference between the first phase at the antenna element 315-*a* and the second phase at the antenna element 315-*b* satisfies a threshold. Algorithms for aligning the antenna panel 305 relative to one or more axes are described with reference to FIGS. 4A and 4B.

Figure 4A:
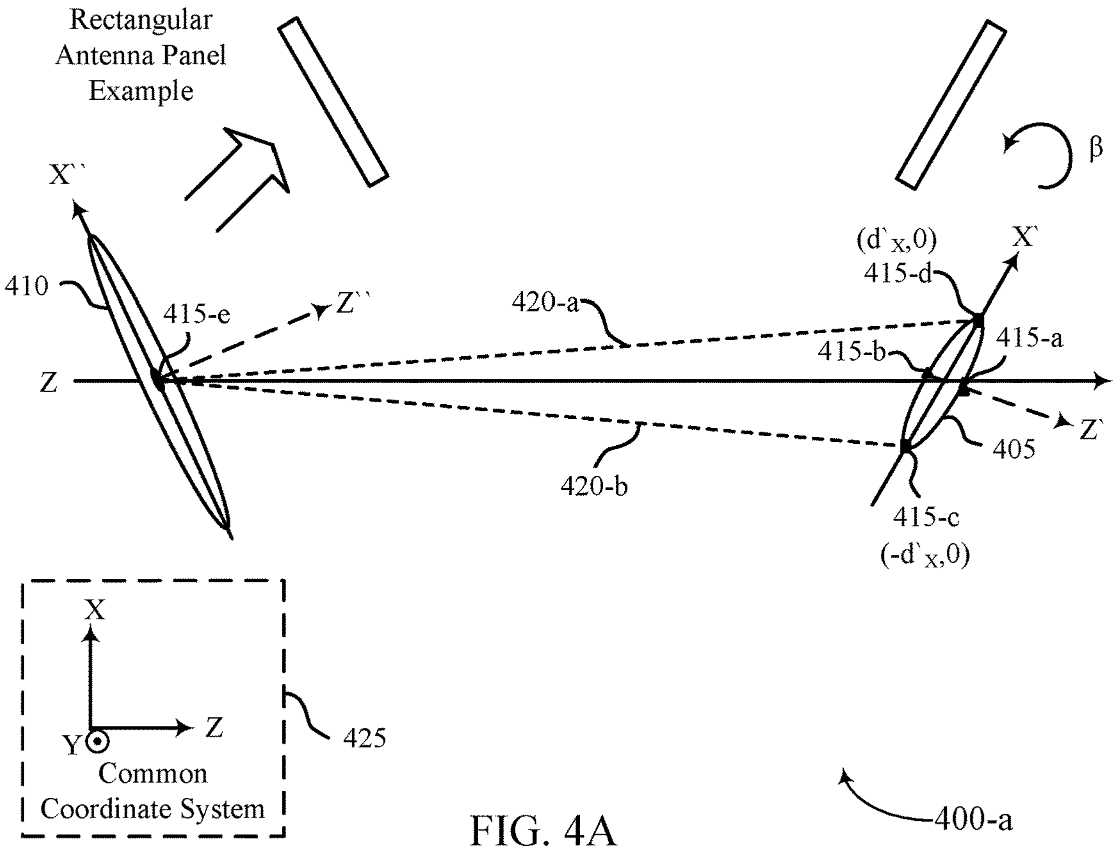
FIGS. 4A and 4B illustrate examples of antenna panel configurations that support rotational alignment for MIMO devices in accordance with one or more aspects of the present disclosure.
Figure 4B:
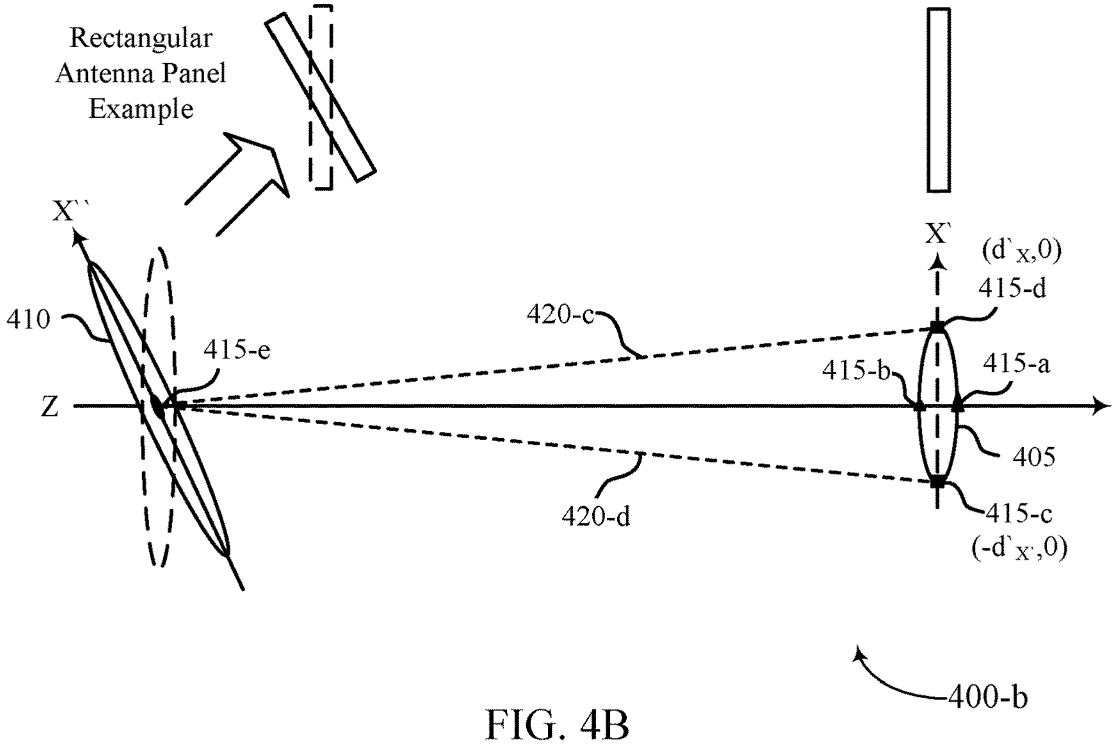

FIGS. 4A and 4B illustrate examples of antenna panel configurations 400 that support rotational alignment for MIMO devices in accordance with one or more aspects of the present disclosure. In some examples, the antenna panel configurations 400 may implement aspects of wireless communications systems 100 or 200 or the antenna panel configurations 300 described with reference to FIGS. 1-3. In this example, the antenna panel configurations 400 may include a first antenna panel 405 associated with a first device (e.g., a receiving device) and a second antenna panel 410 associated with a second device (e.g., a transmitting device). The first and second devices may represent examples of wireless devices as described with reference to FIGS. 1-3. For example, each of the first and second devices may represent an example of a UE, a base station, an RU, a DU, a CU, an IAB node or some other device.

The antenna panel configurations 400-*a* and 400-*b* illustrate the first and second antenna panels described with reference to FIGS. 3A and 3B from a different perspective and at the same or a different point in time. For example, the first antenna panel 405 and the second antenna panel 410 may correspond to the first antenna panel 305 and the second antenna panel 310, respectively, and the common coordinate system 425 may similarly correspond to (e.g., be the same as) the common coordinate system 325 in FIGS. 3A and 3B. From the perspective illustrated by the antenna panel configurations 400-*a* and 400-*b*, the Y axis of the common coordinate system 425 may be pointing out of the page (e.g., a bird's eye view relative to FIGS. 3A and 3B).

As described with reference to FIGS. 3A and 3B, each of the first and second antenna panels may include one or more antenna elements 415. The first antenna panel 405 at the first device may include at least four antenna elements 415-*a*, 415-*b*, 415-*c*, and 415-*d*. The second antenna panel 410 at the second device may include at least one central antenna element 415-*e*, which may be located at or near a centroid of the antenna panel 410, among one or more other non-central antenna elements 415 (not illustrated in FIG. 4).

The antenna panel configuration 400-*a* of FIG. 4A illustrates an example of misalignment between the antenna panel 405 and the antenna panel 410. In this example, the antenna panel 405 may initially be oriented according to the X', Y' (not illustrated in FIG. 4 for clarity), and Z' coordinate system illustrated in FIG. 4A, such that the planar face of the antenna panel 405 may extend in the X' and Y'-axes and may be perpendicular to the Z'-axis. The antenna panel 410 may initially be oriented according to the X", Y" (not illustrated in FIG. 4 for clarity), and Z" coordinate system illustrated in FIG. 4A, such that the planar face of the antenna panel 410 may extend in the X" and Y'-axes and may be perpendicular to the Z'-axis. One or more of the X", Y", and Z"-axes of the planar face of the second antenna panel 410 may be misaligned with (e.g., non-parallel to, having a non-zero angular offset from) the X', Y', and Z'-axes of the planar face of the first antenna panel 405. In some aspects, the X', Y', and Z' coordinate system and the X", Y", and Z" coordinate system may each represent examples of corresponding coordinate systems described with reference to FIG. 3A before the antenna panel 305 is rotated.

As illustrated in FIG. 4A, a first distance 420-*a* between the antenna element 415-*c* and the central antenna element 415-*e* may be different than a second distance 420-*b* between the antenna element 415-*d* and the central antenna element 415-*e*. The antenna element 415-*c* and the antenna element 415-*d* may both be positioned or located on the X'-axis of the antenna panel 305 and may correspond to an antenna element pair, as described with reference to FIGS. 2 and 3. As such, the X'-axis of the planar face of the antenna panel 405 may be misaligned with the X-axis of the common coordinate system 425 in the example of FIG. 4A.

FIG. 4B illustrates an antenna panel configuration 400-*b* after the first device adjusts an angular rotation of the first antenna panel 405 around the Y'-axis (which may be the same as or different than the Y-axis of the common coordinate system 425) to modify the distances 420-*a* and 420-*b*. After the antenna panel 405 is rotated around the Y'-axis, the first distance 420-*a* may be adjusted to the distance 420-*c* and the second distance 420-*b* may be adjusted to distance 420-*d*. The distances 420-*c* and 420-*d* may be the same (e.g., the distances 420-*c* and 420-*d* are equalized), or in some aspects, a difference between the distances 420-*c* and 420-*d* may be less than a threshold difference.

The panel rotations may be based on the measurement of relative phases at one or more transmit and receive antenna elements 415. For example, as described with reference to FIG. 2, the first and second devices may exchange one or more reference signals to facilitate the panel rotation procedure. A reference signal may be transmitted from a center transmit antenna element 415-*e* at the second device (e.g., a transmitting device in the example of FIG. 4), and the first device (e.g., a receiving device in the example of FIG. 4) may perform a channel estimation at one or more pairs of antenna elements 415 based on the reference signal.

The first device may receive a reference signal transmitted from the central antenna element 415-*e* at the antenna element 415-*c* and the antenna element 415-*d* (e.g., an antenna element pair). In some aspects, the first device may receive the reference signal at one or more other antenna elements 415, but the first device may refrain from processing and measuring the reference signal at the one or more other antenna elements 415. The first device may perform a channel estimation at the antenna element 415-*c* and the antenna element 415-*d* to estimate a relative phase difference between a first phase at the antenna element 415-*c* and a second phase at the antenna element 415-*d*. The first device may adjust the angular rotation of the antenna panel 405 around the Y'-axis based on the relative phase to ensure that a difference between the distances 420-*c* and 420-*d* is less than a threshold.

The first device may utilize one or more algorithms for performing the described panel rotations around both the X' and the Y'-axes, as illustrated in FIGS. 3B and 4B, respectively. In some aspects, rectangular coordinates may be used for the algorithms, although the results may be easy applicable to OAM and Polar coordinates. The coordinates for the receive plane (for example, for the first antenna panel 405) may have their origin at $(0,0,Z_0)$ and $(-\gamma,-\beta,-\alpha)$ with respect to the X, Y, and Z-axes of the common coordinate system 425, where $\gamma$ may represent an angular rotation around the X-axis, $\beta$ may represent an angular rotation around the Y-axis, and a may represent an angular rotation around the Z-axis.

With respect to coordinate transform (e.g., with respect to the rotation matrix), a point with receive plane coordinates of (x',y',0) may have its coordinates in the common coordinate system 425 according to Equation 1 below:

$$\begin{bmatrix} x \\ y \\ z \end{bmatrix} = \begin{bmatrix} 0 \\ 0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (1)$$

In a direct solution approach to estimating/adjusting for the misalignment, the coordinates $X_0$, $Y_0$, $Z_0$, $\gamma$, $\beta$, $\alpha$ leave six unknown variables to solve for, which may be difficult to solve for given the degree of freedom between the antenna arrays. However, if a reference signal is transmitted by the central antenna element 415-*e* of the transmit antenna panel 410, and the first device measures the relative phase between the received reference signal at $(d'_X,0)$ and $(-d'_X,0)$ and the relative phase between the received reference signal at $(d'_Y,0)$ and $(-d'_Y,0)$, the angles $\beta$ and $\gamma$ may be solved.

The distance to the receive plane position of $(d'_X,0)$ from a central antenna element 415-*e* (e.g., the distances 420-*a* and 420-*c* between the central antenna element 415-*e* and the antenna element 415-*d* in FIGS. 4A and 4B) may be solved according to Equation 2 below. The distance to the receive plane position of $(-d'_X,0)$ from the central antenna element 415-*e* (e.g., the distances 420-*b* and 420-*d* between the central antenna element 415-*e* and the antenna element 415-*c* in FIGS. 4A and 4B) may be solved according to Equation 3 below.

$$\sqrt{(\cos\alpha\cos\beta d'_x)^2 + (\sin\alpha\cos\beta d'_x)^2 + (z_0 - \sin\beta d'_x)^2} = \sqrt{d'^2_x - 2\sin\beta d'_x z_0 + z_0^2} \approx z_0 + \frac{d'^2_x - 2\sin\beta d'_x z_0}{2z_0} \quad (2)$$

$$\sqrt{(-\cos\alpha\cos\beta d'_x)^2 + (-\sin\alpha\cos\beta d'_x)^2 + (z_0 + \sin\beta d'_x)^2} = \sqrt{d'^2_x + 2\sin\beta d'_x z_0 + z_0^2} \approx z_0 + \frac{d'^2_x + 2\sin\beta d'_x z_0}{2z_0} \quad (3)$$

Similarly, the distance to the receive plane position of $(0, d'_Y)$ from a central antenna element 315-*e* (e.g., the distances 320-*a* and 320-*c* between the central antenna element 315-*e* and the antenna element 315-*a* in FIGS. 3A and 3B) may be solved according to Equation 4 below. The distance to the receive plane position of $(0, -d'_Y)$ from a central antenna element 315-*e* (e.g., the distances 320-*b* and 320-*d* between the central antenna element 315-*e* and the antenna element 315-*b* in FIGS. 3A and 3B) may be solved according to Equation 5 below.

$$\{[(\cos\beta\sin\beta\sin\gamma - \sin\alpha\cos\gamma)d'_y]^2 + [(\sin\alpha\sin\beta\sin\gamma + \cos\alpha\cos\gamma)d'_y]^2 + (z_0 + \cos\beta\sin\gamma\, d'_y)^2\}^{1/2} = \sqrt{d'^2_y + 2\cos\beta\sin\gamma z_0 + z_0^2} \approx z_0 + \frac{d'^2_y + 2\cos\beta\sin\gamma z_0}{2z_0} \quad (4)$$

$$\{[-(\cos\beta\sin\beta\sin\gamma - \sin\alpha\cos\gamma)d'_y]^2 + [-(\sin\alpha\sin\beta\sin\gamma + \cos\alpha\cos\gamma)d'_y]^2 + (z_0 - \cos\beta\sin\gamma\, d'_y)^2\}^{1/2} = \sqrt{d'^2_y - 2\cos\beta\sin\gamma z_0 + z_0^2} \approx z_0 + \frac{d'^2_y - 2\cos\beta\sin\gamma z_0}{2z_0} \quad (5)$$

A difference between the distances 420-*a* and 420-*b* may thus be ≈

$$-2\sin\beta d'_x,$$

and a difference between the distances 320-*a* and 320-*b* may thus be ≈

$$2\cos\beta\sin\gamma d'_y,$$

assuming that the coordinates of the receive plane of the antenna panel 405 have an origin at $(0,0,Z_0)$ and $(-\gamma,-\beta,-\alpha)$ with respect to the X, Y, and Z-axes of the common coordinate system 425.

Accordingly, the first device may rotate a receive panel with respect to the Y'-axis until $\beta=0$, and the first device may rotate the receive antenna panel with respect to the X'-axis until $\gamma=0$. For example, the first device may rotate the receive antenna panel 405 with respect to the Y'-axis until the distance 420-*a* to the receive antenna element 415-*d* at $(d'_X,0)$ is equal to, or within a threshold difference from, the distance 420-*b* to the receive antenna element 415-*c* at $(-d'_X,0)$ (e.g., $\beta=0$), as illustrated in FIG. 4B. In the second stage of the panel rotation procedure, the first device may rotate the receive antenna panel 305 with respect to the X'-axis until the distance 320-*a* to the receive antenna element 315-*a* at $(0, d'_Y)$ is equal to, or within a threshold difference from, the distances 320-*b* to the receive antenna element 315-*b* at $(0, -d'_Y)$ (e.g., $\gamma=0$), as illustrated in FIG. 3B.

Although the rotations around the X' and Y'-axes are illustrated separately in FIGS. 3 and 4 for clarity, it is to be understood that the rotations around one or more axes may be performed concurrently or in any order. For example, the rotation around the Y'-axis may occur before the rotation around the X'-axis, or vice versa. The order of the panel rotation may be reversed if the rotation order in the coordinates transform is changed (e.g., if Equations 2 and 3 can be solved before Equations 4 and 5).

In multiple steps discussed herein, there may be an evaluation (for example, comparison) of distance that may be implemented by comparison of the measured phase(s). For example, a phase difference between a receive position of $$(d'_x, 0)$$

and a receive position of $$(-d'_x, 0)$$

may be $$\frac{2\pi}{\lambda}(-2\sin\beta d'_x).$$

The phase may have a periodicity of $2\pi$, so phase comparison may be ambiguous in some cases. However, it may be assumed that such ambiguity has been removed based on the techniques discussed herein. For example, one or more methods for phase de-ambiguity are described herein.

A first method may include utilizing multiple pairs of antenna elements 415 for each axis such that a different distance $$d'_x$$

may avoid the integer $2\pi$, which may be referred to as space sampling. A second method may include transmitting a reference signal at multiple frequencies, or multiple wavelengths ($\lambda$), which may be referred to as frequency sampling. The space sampling, frequency sampling, or both may be dense enough to achieve phase de-ambiguity. For example, a wireless device may base a first phase measurement on an average or median of multiple phase measurements of a first reference signal received across multiple frequencies, across, multiple antenna elements 415 of an antenna panel, or both and a second phase measurement on an average or median of multiple phase measurements of a second reference signal received across multiple frequencies, across, multiple antenna elements 415 of an antenna panel, or both.

In some aspects, more than one pair of antenna elements 415 along each axis may be used to calculate and adjust the rotation to reduce phase ambiguity. For example, the first device may adjust the angular rotation of the antenna panel 405 relative to the Y'-axis using measurements of reference signal(s) at the antenna element 415-*d* and the antenna element 415-*c* (e.g., a first antenna element pair), as well as measurements of reference signal(s) at a second pair of antenna elements 415 that are positioned on the Y'-axis (not pictured in FIG. 4). In some aspects, the rotation adjustment along each axis may be carried out in multiple steps, where each step may have a decreasing step size. Adjusting the angular rotation based on measurements at multiple pairs of antenna elements may improve reliability and precision of the adjustment procedure.

If a single pair of antenna elements 415 is used, the antenna elements 415 in the pair may be separated as far as possible to improve accuracy. For example, a distance between the antenna element 415-*a* and 415-*d* may be greater than or equal to a distance between any two antenna elements 415 on the antenna panel 405. In some aspects, the adjustments may be performed around more than two axes, including axes that are the same as or different than the X' and Y'-axes.

As also discussed herein, the accuracy of the phase measurements (which are used to estimate the distance between each antenna element) may be improved to improve reliability of the described techniques. This may include assuming the received signal at a receive plane from a transmit plane, after coherent integration in time, is in the form of $\gamma=Ae^{j\theta}+z$, where A may be the signal amplitude and z $(z=z_r+jz_i)$ may be noise. $z_r$ and $z_i$ may be the real and imaginary parts, respectively, and a total variance $\sigma^2$. In some aspects, $\gamma=\mathrm{Real}(y)+j\mathrm{Imag}(y)=A\cos(\theta)+jA\sin(\theta)+z_r+jz_i$ and $$\hat{\theta} = \mathrm{Phase}(y) = \arctan(y) = \arctan\left(\frac{A\sin(\theta)+z_i}{A\cos(\theta)+z_r}\right).$$

At relatively high SINR (e.g., above a threshold), Equation 6 may be assumed:

$$E[\hat{\theta}] \cong \theta,\ \mathrm{Var}[\hat{\theta}] \cong \mathrm{Var}\left[\arctan\left(\frac{A\sin(\theta)+z_i}{A\cos(\theta)+z_r}\right)\right] \cong \tag{6}$$

$$\left[\frac{1}{1+E\left\{\left|\frac{A\sin(\theta)+z_i}{A\cos(\theta)+z_r}\right|^2\right\}}\right]^2 \mathrm{var}\left(\frac{A\sin(\theta)+z_i}{A\cos(\theta)+z_r}\right) \cong$$

$$\left[\frac{1}{1+\tan(\theta)^2}\right]^2 E\left|\frac{A\sin(\theta)+z_i}{A\cos(\theta)+z_r} - \frac{A\sin(\theta)}{A\cos(\theta)}\right|^2 \cong$$

-continued $$\left[\frac{1}{1+\tan(\theta)^2}\right]^2 E\left|\frac{z_i\cos(\theta)+z_r\sin(\theta)}{A\cos(\theta)}\right|^2 =$$

$$\left[\frac{1}{1+\tan(\theta)^2}\right]^2 \frac{\frac{\sigma^2}{2}\left[1+\tan(\theta)^2\right]}{|A|^2} = \frac{1}{2SNR\left[1+\tan(\theta)^2\right]}$$

Thus, at a relatively high SINR, $$E[\hat{\theta}] \cong \theta,\ \mathrm{Var}[\hat{\theta}] \cong \frac{1}{2SNR\left[1+\tan(\theta)^2\right]}.$$

The Var[$\hat{\theta}$] may be small if tan(θ)→∞, but this may not pose any practical problem because the singularity of tan(θ) at θ=π/2 and θ=3π/2 may be mitigated. To evaluate (for example, compare) two phases at two receive plane units, the phase difference, which can be accurately estimated, may be around $$\frac{1}{\sqrt{SNR}}.$$

The phase difference may be relatively small due to the nature of par-axial approximation. Then the coherent integration may be used to boost SNR. No array gain may be possible because no beamforming may be used at this stage. Phase noise may be mitigated, or non-coherent integration may be used to further increase the phase difference evaluation (for example, comparison).

Accordingly, the first or second devices (or both) may determine the noise level for the channel between the first antenna panel 405 and the second antenna panel 410, which may determine the phase accuracy for the measurements, at least to some degree. In some aspects, the first or second devices (or both) may compare a first phase measurement, a second phase measurement, or both to a phase tolerance threshold. The devices may determine to use the phase measurements for adjusting the angular rotation of an antenna panel based on the phase measurements satisfying the phase tolerance threshold.

The described techniques may be applied to other shapes of antenna panels, such as square antenna panels, elliptical antenna panels, triangular antenna panels, or rectangular antenna panels, as illustrated in FIGS. 3A-4B. For example, two or more devices in communication may each be deployed with antenna elements 415 disposed in a rectangular shape on a rectangular antenna panel. In such cases, the devices may perform similar antenna panel rotation procedures to align the antenna panels. For example, as illustrated by the rectangular antenna panel examples in FIGS. 3A-4B, the first device and the second device may adjust an angular position of a respective rectangular panel around the X' and Y'-axes to align the corresponding antenna panels. The devices may utilize the algorithms described with respect to Equations 1-5 to perform the angular rotation adjustment for any other shape of antenna panels.

After one device in a pair of transmitting and receiving devices (e.g., one side) has adjusted a respective antenna panel to be perpendicular to the common Z-axis, the same procedure may be applied to an antenna panel at the other device (e.g., the other side) so that both sides may be made perpendicular to the Z-axis. For example, after the first device adjusts the angular rotation of the first antenna panel 405 to be perpendicular to the Z-axis, as illustrated in FIGS. 3B and 4B, the second device may perform a similar panel rotation procedure based on Equations 1-5 to adjust an angular rotation of the second antenna panel 410 so that a plane of the antenna panel 410 is perpendicular to the Z-axis (e.g., as illustrated by the dashed lines in FIGS. 3B and 4B).

It is to be understood that the first device and the second device may perform similar antenna panel rotation procedures as described herein at the same or different times, and in any order. For example, because the panel rotation procedures are performed using reference signals that are transmitted by a central antenna element 415 of one device and received by one or more non-central antenna elements of another device, the first device and the second device may perform the adjustment at least partially concurrently (e.g., the devices may each transmit and receive the reference signals at the same time). The devices may exchange alignment feedback information to indicate a status of the alignment procedure (e.g., a relative phase difference between a pair of antenna elements 415), as described with reference to FIG. 2.

In some aspects, the alignment of the X- and Y-axes may be subsequently applied if needed. For example, after aligning the plane of one or both of the antenna panels 405 and 410 to be perpendicular to the common axis, the first device, the second device, or both may further adjust alignment of the plane of a respective antenna panel by rotating the antenna panel around the common axis (e.g., the Z-axis of the common coordinate system 425) in a third stage of the panel rotation procedure. The rotation of the antenna panel around the common axis may eliminate an offset for X- and Y-axes by minimizing a distance between a pair of corresponding antennas at each device, as described in further detail elsewhere herein, including with reference to FIG. 5.

Figure 5A:
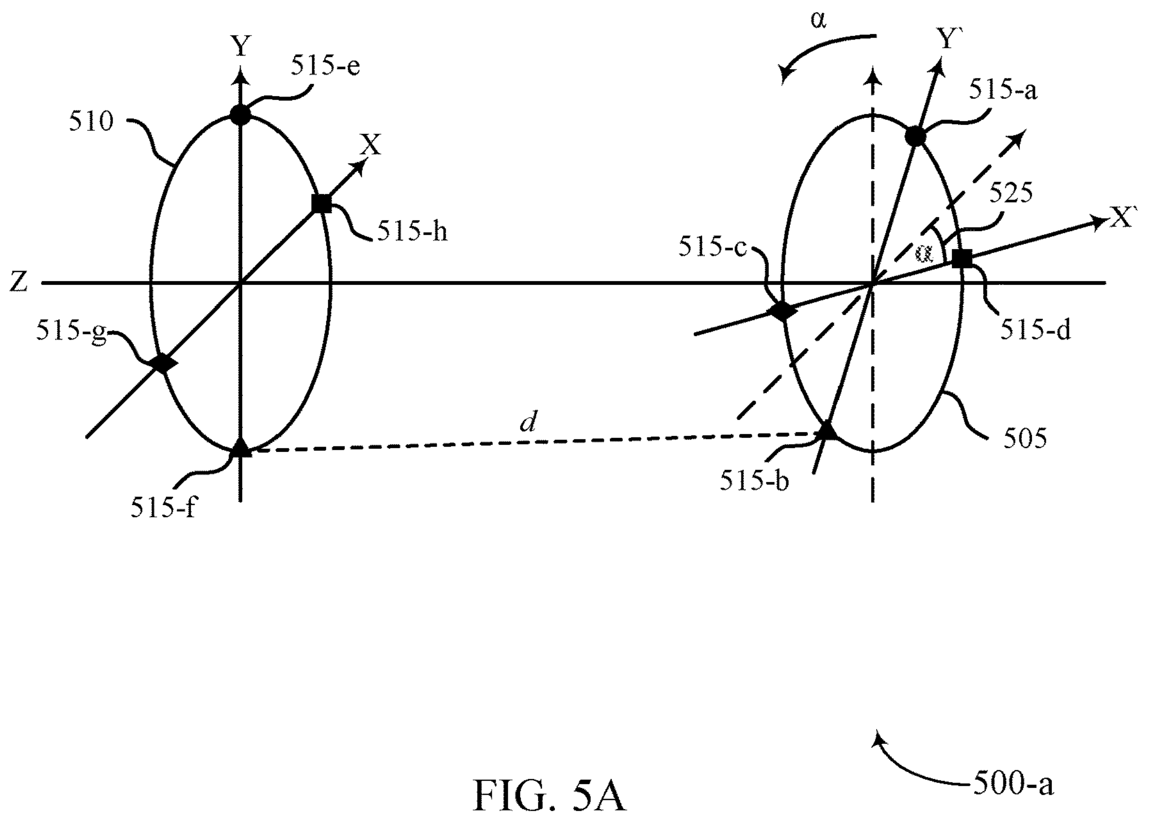
FIGS. 5A and 5B illustrate examples of antenna panel configurations that support rotational alignment for MIMO devices in accordance with one or more aspects of the present disclosure.
Figure 5B:
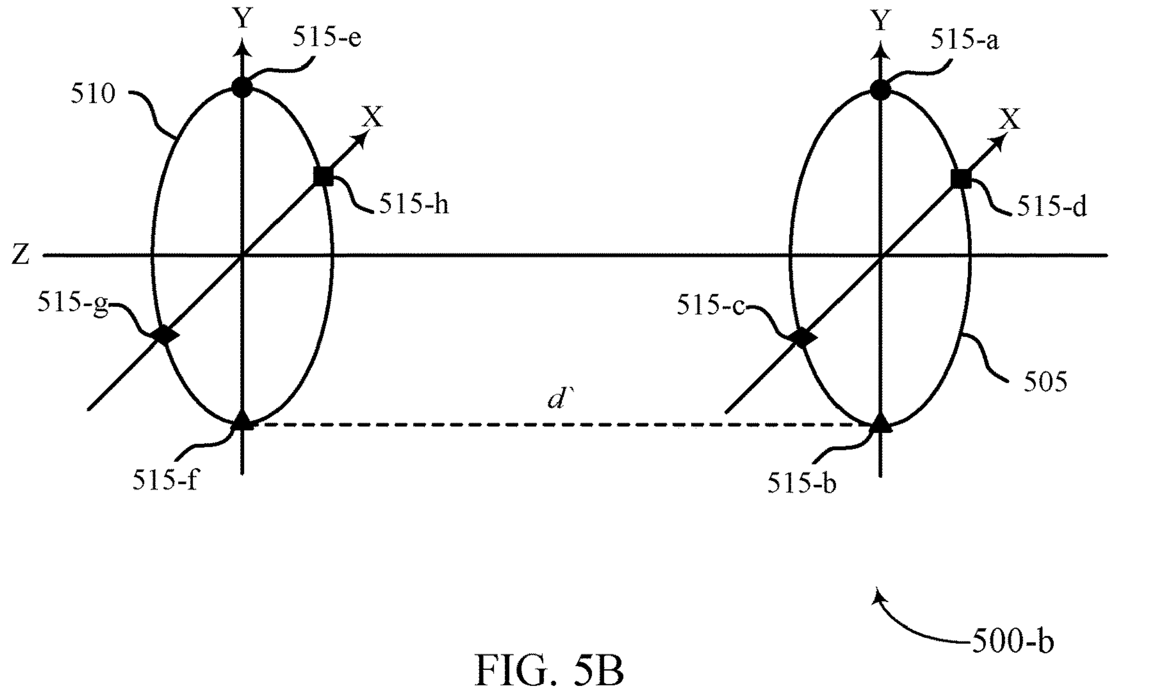

FIGS. 5A and 5B illustrate examples of antenna panel configurations 500 that support rotational alignment for MIMO devices in accordance with one or more aspects of the present disclosure. In some aspects, the antenna panel configurations 500 may implement aspects of wireless communications systems 100 or 200 or the antenna panel configurations 300 and 400 described with reference to FIGS. 1-4. In this example, the antenna panel configuration 500 may include a first antenna panel 505 associated with a first device (e.g., a receiving device) and a second antenna panel 510 associated with a second device (e.g., a transmitting device). The first and second devices may represent examples of wireless devices as described with reference to FIGS. 1-4. For example, each of the first and second devices may represent an example of a UE, a base station, an RU, a DU, a CU, an IAB node or some other device.

Each of the antenna panel 505 and the antenna panel 510 may include a respective set of one or more antenna elements 515. In some aspects, each antenna element 515 of the antenna panel 505 may correspond to a respective antenna element 515 of the antenna panel 510, or vice versa. In the example of FIG. 5, correspondence between antenna elements 515 at different devices may be illustrated by respective shapes of the antenna elements 515. For example, the antenna element 515-*a* of the antenna panel 505 may correspond to the antenna element 515-*e* of the antenna panel 510, which may be illustrated as circular antenna elements 515 for clarity. Similarly, the antenna element 515-*b* of the antenna panel 505 may correspond to the antenna element 515-*f* of the antenna panel 510, which may be illustrated as triangular antenna elements 515 for clarity. The antenna element 515-*c* of the antenna panel 505 may correspond to the antenna element 515-*g* of the antenna panel 510, which may be illustrated as diamond-shaped antenna elements 515 for clarity. The antenna element 515-*d* of the antenna panel 505 may correspond to the antenna element 515-*h* of the antenna panel 510, which may be illustrated as square antenna elements 515 for clarity. It is to be understood that the shapes of the antenna elements 515 illustrated in FIG. 5 are for clarity purposes, and the antenna elements 515 of an antenna panel at a wireless device may be any size or shape.

FIG. 5A illustrates an antenna panel configuration 500-*a* including the first antenna panel 505 and the second antenna panel 510 after the planes of the antenna panels have been aligned according to the techniques described with reference to FIGS. 3 and 4. For example, a plane of the antenna panel 505 may be parallel to the plane of the antenna panel 510, and the planes of the antenna panels 505 and 510 may both be perpendicular to a Z-axis that intersects a centroid of each antenna panel (e.g., γ=#=0). As such, respective distances between a pair of antenna elements 515 located on an axis of each antenna panel may be the same. For example, a distance between the antenna element 515-*e* of the antenna panel 510 and the centroid of the antenna panel 505 may be the same as a distance between the antenna element 515-*f* of the antenna panel 510 and the centroid of the antenna panel 505.

In some aspects, after the planes of both antenna panels are aligned, there may be an angular offset between the X and Y-axes of the antenna panels, which may be represented by the rotational angle 525 (e.g., a) around the Z-axis. Accordingly, techniques described herein provide for the rotational angle 525 to be reduced or eliminated once the antenna panels on both sides are perpendicular to the Z-axis. The reduction of the rotational angle 525 may or may not be needed in some scenarios. For example, for some OAM communication scenarios, the antenna elements 515 are arranged in circles and an offset like the rotational angle 525 may not affect a mode orthogonality. In some other aspects, reduction or elimination of the rotational angle 525 may provide for further alignment between antenna panels and corresponding antenna elements 515, which may improve communications.

The rotational angle 525 may be reduced based on one or more distance calculations. For example, a distance between a pair of corresponding antenna elements 515 at different devices may be calculated, and the distance may be minimized when the rotational angle 525 is zero. The distance calculations may be applied for one or more pairs of corresponding antenna elements across the devices and averaged, such that an average distance over a set of multiple distances between multiple pairs of antenna elements may be minimized.

In the example of FIG. 5, a distance, d, between the antenna element 515-*a*, which may be at a receive position of (0, $d'_Y$,0) on the antenna panel 505 and the antenna element 515-*e*, which may be at a transmit position of (0, $d_Y$,0) on the antenna panel 510, may be calculated according to equation 7 below.

$$d \approx \sqrt{[z_0]^2 + (-\sin\alpha)^2 d_y'^2 + \left[\cos\alpha\, d_y' - d_y\right]^2} \tag{7}$$

To minimize the distance, d, between the receive position of (0, $d'_Y$,0) and the transmit position of (0, $d_Y$,0), one of the antenna panels may rotate along the Z-axis in the direction of the smaller distance. For example, one of the antenna panel 305 or the antenna panel 310 may rotate around the Z-axis in an angular direction that reduces the distance d. In some aspects, the direction of the Y'-axis may be flipped to keep a rotation of the rotational angle 525 below 90 degrees.

In the example of FIG. 5, the first device may rotate the antenna panel 505 in a counter-clockwise direction, as illustrated by the curved arrow. The first antenna panel 505 may be rotated by an angle that is equal to the rotational angle 525. Although the antenna panel 505 is rotated in the example of FIG. 5, it is to be understood that the antenna panel 510 may alternatively be rotated by the rotational angle 525 in a clockwise direction, or both antenna panels 505 and 510 may be rotated by a portion of the rotational angle 525 until the corresponding antenna elements 515 are aligned.

FIG. 5B illustrates an antenna panel configuration 500-*b* after the antenna panel 505 is rotated by the rotational angle 525. As illustrated in FIG. 5B, each of the corresponding sets of antenna elements 515 may be aligned. For example, the antenna element 515-*a* of the antenna panel 505 may be aligned with the corresponding antenna element 515-*e* of the antenna panel 510, such that a distance, d', between the antenna elements 515-*a* and 515-*e* is minimized or less than a threshold distance.

Figure 6:
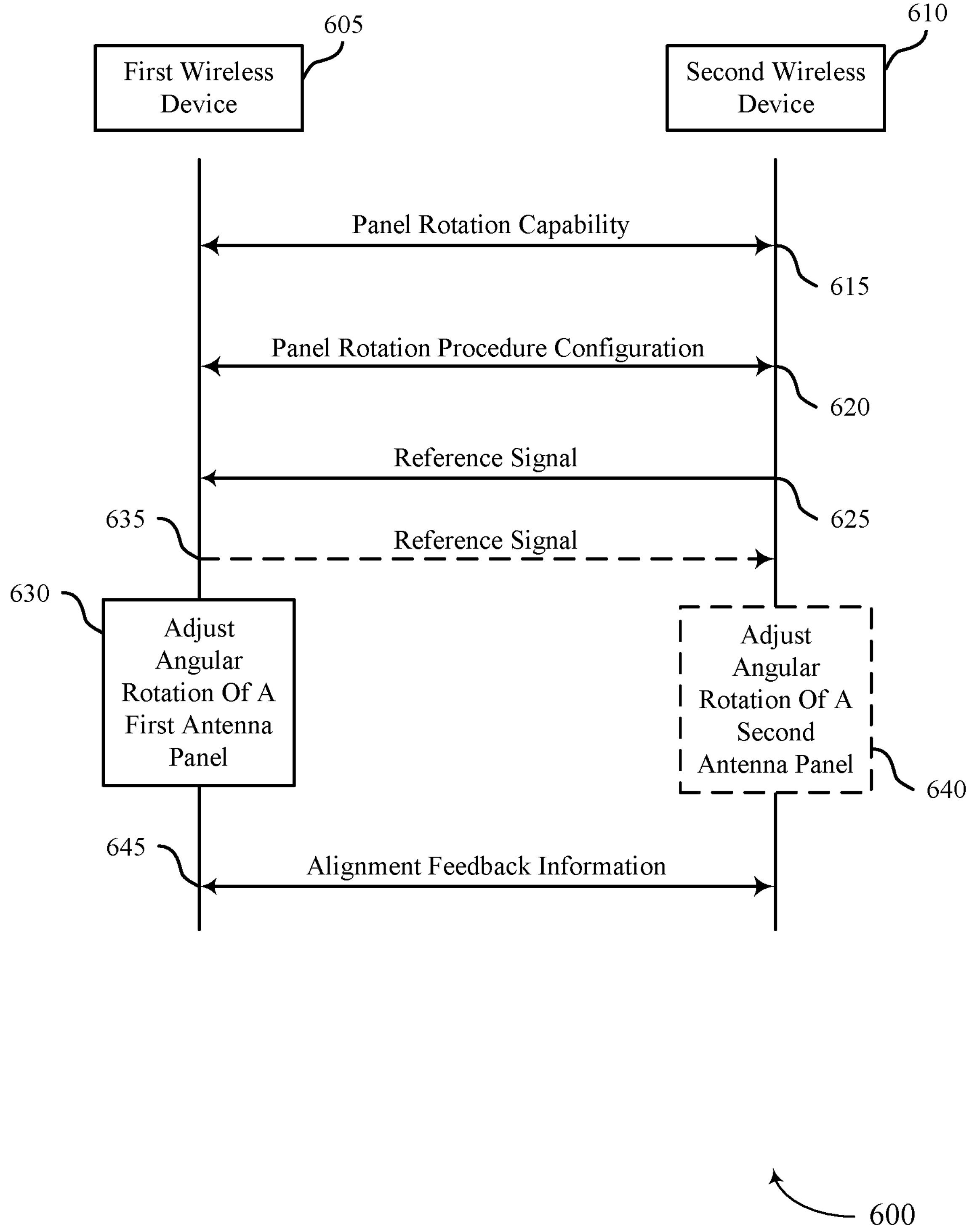
FIG. 6 illustrates an example of a process flow that supports rotational alignment for MIMO devices in accordance with one or more aspects of the present disclosure.

FIG. 6 illustrates an example of a process flow 600 that supports rotational alignment for MIMO devices in accordance with one or more aspects of the present disclosure. The process flow 600 may implement or be implemented by aspects of the wireless communications systems 100 and 200 or the antenna panel configurations 300, 400, or 500. For example, the process flow 600 illustrates communications between a first wireless device 605 and a second wireless device 610, which may represent examples of corresponding devices as described with reference to FIGS. 1-5. The first wireless device 605 and the second wireless device 610 may each represent an example of a UE, a base station, a network entity, an RU, a CU, a DU, an IAB node, or any other wireless device.

In the following description of the process flow 600, the operations between the first wireless device 605 and the second wireless device 610 may be performed in different orders or at different times. Some operations may also be left out of the process flow 600, or other operations may be added. Although the first wireless device 605 and the second wireless device 610 are shown performing the operations of the process flow 600, some aspects of some operations may also be performed by one or more other wireless devices.

In some aspects the first wireless device 605 may be referred to as a receiving device and the second wireless device 610 may be referred to as a transmitting device. The first wireless device 605 and the second wireless device 610 may be equipped with a first antenna panel and a second antenna panel, respectively. Each antenna panel may include a set of one or more antenna elements deployed in a circular shape, a rectangular shape, or some other shape around a central antenna element of the antenna panel, as described with reference to FIGS. 1-5.

At 615, the first wireless device 605 and the second wireless device 610 may communicate signaling that indicates that each of the first wireless device 605 and the second wireless device 610 has a panel rotation capability. To communicate the signaling, the first wireless device 605 may transmit a capability message to the second wireless device 610 that indicates that the first wireless device 605 supports the panel rotation capability, which may be associated with a capability to adjust an angular rotation of an antenna panel at the first wireless device 605. In some aspects, the second wireless device 610 may transmit a capability message to the first wireless device 605 to indicate that the second wireless device 610 supports the panel rotation capability.

At 620, the first wireless device 605 and the second wireless device 610 may communicate a panel rotation procedure configuration based on the panel rotation capability. For example, the second wireless device 610 may transmit a configuration message to the first wireless device 605 that indicates the panel rotation procedure configuration.

At 625, the second wireless device 610 may transmit a reference signal via a central antenna element of the second antenna panel of the second wireless device 610. The second wireless device 610 may transmit the reference signal based on the panel rotation procedure configuration. For example, the panel rotation procedure configuration may include scheduling information associated with the reference signal. The first wireless device 605 may receive the reference signal via a first set of two or more antenna elements of the first antenna panel at the first wireless device 605. In some aspects, the first set of two or more antenna elements may be positioned on an axis of the first antenna panel. For example, the first set of two or more antenna elements may include one or more antenna element pairs, as described with reference to FIGS. 2-5.

At 630, the first wireless device 605 may adjust an angular rotation of the first antenna panel of the first wireless device 605 based on measurements of the reference signal at the first set of two or more antenna elements. The first wireless device 605 may adjust the angular rotation of the first antenna panel to modify a respective distance between each of the first set of two or more antenna elements relative to the central antenna element of the second antenna panel of the second wireless device 610. For example, the first wireless device 605 may adjust the angular rotation of the first antenna panel until a difference between the respective distances is less than a threshold difference. In some aspects, the first wireless device 605 may adjust the angular rotation of the first antenna panel based on one or more phase measurements.

At 635, in some examples, the first wireless device 605 may transmit a reference signal via a central antenna element of the first antenna panel of the first wireless device 605. The second wireless device 610 may receive the reference signal via a second set of two or more antenna elements (e.g., an antenna element pair) of the second antenna panel at the second wireless device 610. At 640, in some examples, the second wireless device 610 may adjust an angular rotation of the second antenna panel based on measurements of the reference signal at the second set of two or more antenna elements of the second antenna panel. The first wireless device 605 may transmit the reference signal before, after, or concurrently with receiving the reference signal from the second wireless device 610 and adjusting the angular rotation of the first antenna panel.

At 645, the first wireless device 605 may transmit, to the second wireless device 610, a message indicating alignment feedback information for the first antenna panel and the second antenna panel. The alignment feedback information may include an indication that the first antenna panel is perpendicular with respect to a line connecting a center of the first antenna panel and a center of the second antenna panel or an indication that the first antenna panel is not perpendicular with respect to the line. In some aspects, the alignment feedback information may include an indication that a difference between a first phase measurement at a first antenna element of the first set of two or more antenna elements of the first antenna panel and a second phase measurement at a second antenna element of the first set of two or more antenna elements of the first antenna panel satisfies a threshold.

In some aspects, the second wireless device 610 may transmit one or more feedback messages including alignment feedback information to the first wireless device 605 based on adjusting the angular rotation of the second antenna panel. The first wireless device 605, the second wireless device 610, or both may determine whether to transmit one or more additional reference signals for the other device to use for further adjustments of the antenna panels based on the alignment feedback information.

Figure 7:
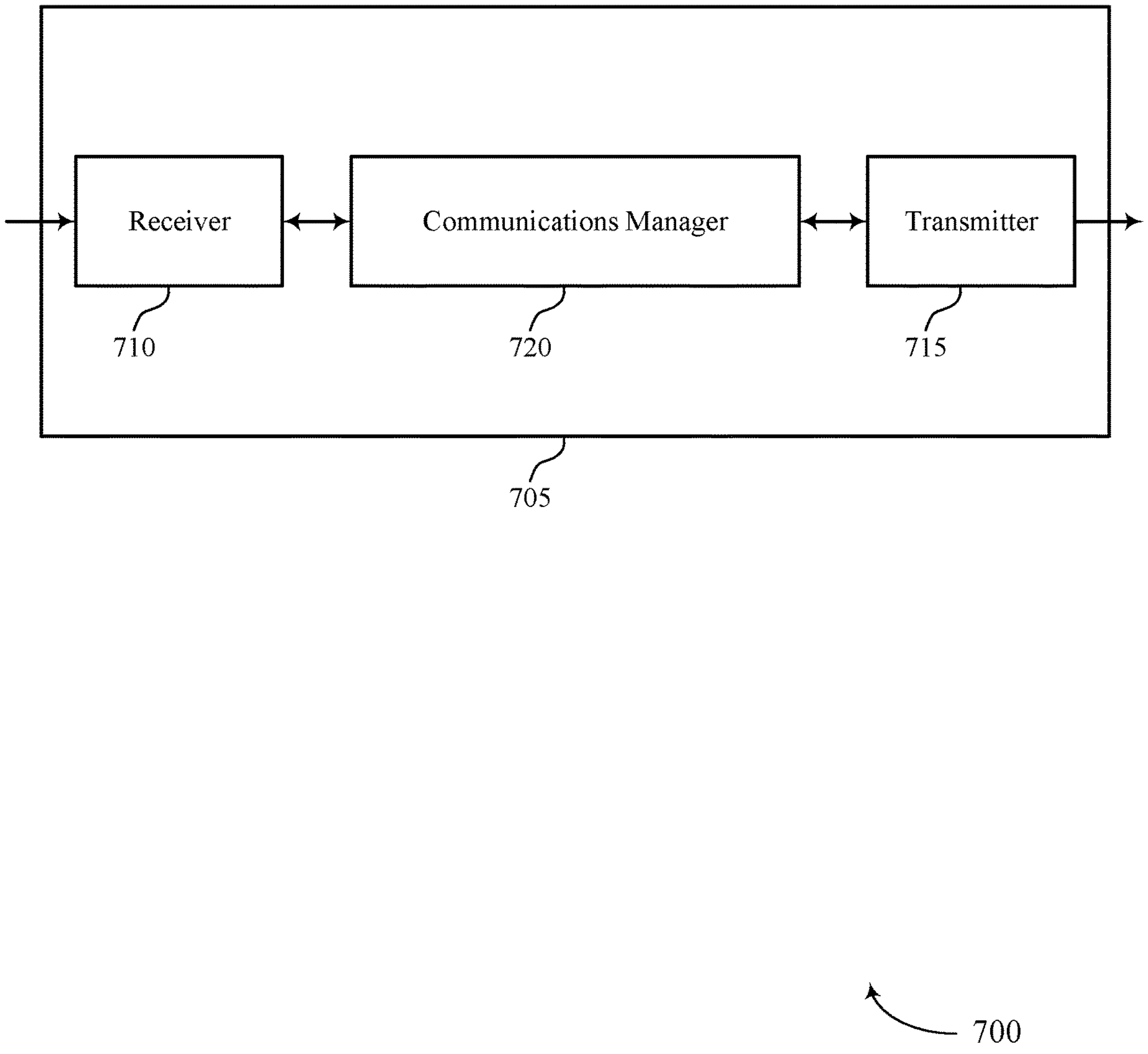
FIGS. 7 and 8 show block diagrams of devices that support rotational alignment for MIMO devices in accordance with one or more aspects of the present disclosure.

FIG. 7 shows a block diagram 700 of a device 705 that supports rotational alignment for MIMO devices in accordance with one or more aspects of the present disclosure. The device 705 may be an example of aspects of a UE 115 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to rotational alignment for MIMO devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to rotational alignment for MIMO devices). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of rotational alignment for MIMO devices as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. For example, the communications manager 720 may be configured as or otherwise support a means for communicating signaling between the first wireless device and a second wireless device that indicates that each of the first wireless device and the second wireless device has a panel rotation capability. The communications manager 720 may be configured as or otherwise support a means for receiving, via a first set of two or more antenna elements of a set of multiple antenna elements of a first antenna panel of the first wireless device, a reference signal transmitted by a central antenna element of a second antenna panel of the second wireless device. The communications manager 720 may be configured as or otherwise support a means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The communications manager 720 may be configured as or otherwise support a means for transmitting, to the second wireless device, a message indicating alignment feedback information for the first antenna panel and the second antenna panel.

Additionally, or alternatively, the communications manager 720 may support wireless communication at a second wireless device in accordance with examples as disclosed herein. For example, the communications manager 720 may be configured as or otherwise support a means for communicating signaling between a first wireless device and a second wireless device that indicates that each of the first wireless device and the second wireless device has a panel rotation capability. The communications manager 720 may be configured as or otherwise support a means for communicating, with the first wireless device, a panel rotation procedure configuration based on the panel rotation capability. The communications manager 720 may be configured as or otherwise support a means for transmitting a reference signal via a central antenna element of a second antenna panel of the second wireless device based on the panel rotation procedure configuration. The communications manager 720 may be configured as or otherwise support a means for receiving, by the second wireless device, a message indicating alignment feedback information for the second antenna panel of the second wireless device and a first antenna panel of the first wireless device based on the reference signal.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, more efficient utilization of communication resources. For example, the device 705 may support the panel rotation capability, which may provide for the device 705 to dynamically adjust an angular rotation of an antenna panel. By supporting the panel rotation capability, the processor of the device 705 may reduce complexity and power consumption associated with shifting a physical position of the antenna panel. Additionally, or alternatively, one or more algorithms for determining alignment between antenna panels may be simplified, which may reduce processing and complexity as compared with alignment procedures in which one antenna panel is fixed.

Figure 8:
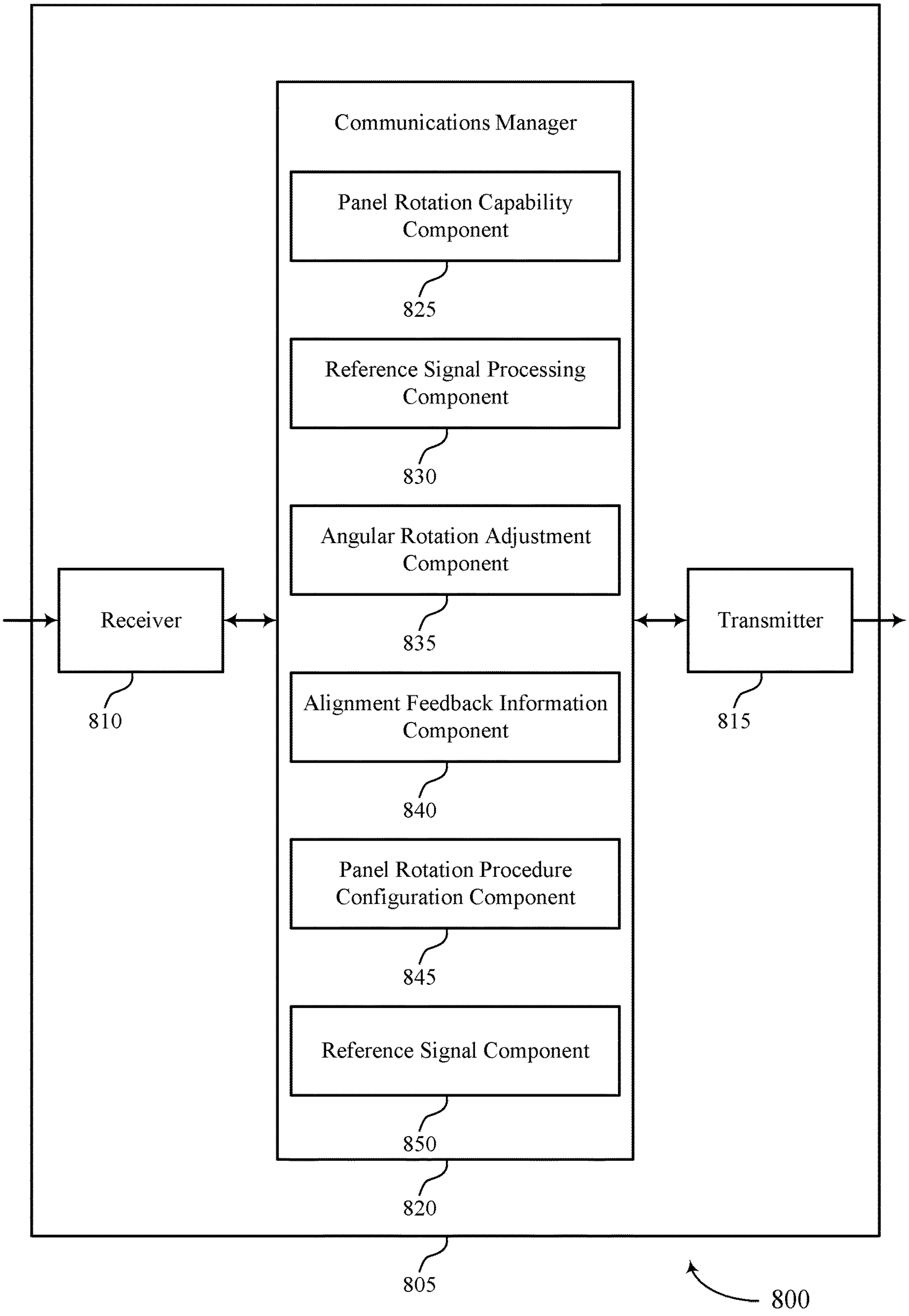

FIG. 8 shows a block diagram 800 of a device 805 that supports rotational alignment for MIMO devices in accordance with one or more aspects of the present disclosure. The device 805 may be an example of aspects of a device 705, a UE 115, or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to rotational alignment for MIMO devices). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to rotational alignment for MIMO devices). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of rotational alignment for MIMO devices as described herein. For example, the communications manager 820 may include a panel rotation capability component 825, a reference signal processing component 830, an angular rotation adjustment component 835, an alignment feedback information component 840, a panel rotation procedure configuration component 845, a reference signal component 850, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first wireless device in accordance with examples as disclosed herein. The panel rotation capability component 825 may be configured as or otherwise support a means for communicating signaling between the first wireless device and a second wireless device that indicates that each of the first wireless device and the second wireless device has a panel rotation capability. The reference signal processing component 830 may be configured as or otherwise support a means for receiving, via a first set of two or more antenna elements of a set of multiple antenna elements of a first antenna panel of the first wireless device, a reference signal transmitted by a central antenna element of a second antenna panel of the second wireless device. The angular rotation adjustment component 835 may be configured as or otherwise support a means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The alignment feedback information component 840 may be configured as or otherwise support a means for transmitting, to the second wireless device, a message indicating alignment feedback information for the first antenna panel and the second antenna panel.

Additionally, or alternatively, the communications manager 820 may support wireless communication at a second wireless device in accordance with examples as disclosed herein. The panel rotation capability component 825 may be configured as or otherwise support a means for communicating signaling between a first wireless device and a second wireless device that indicates that each of the first wireless device and the second wireless device has a panel rotation capability. The panel rotation procedure configuration component 845 may be configured as or otherwise support a means for communicating, with the first wireless device, a panel rotation procedure configuration based on the panel rotation capability. The reference signal component 850 may be configured as or otherwise support a means for transmitting a reference signal via a central antenna element of a second antenna panel of the second wireless device based on the panel rotation procedure configuration. The alignment feedback information component 840 may be configured as or otherwise support a means for receiving, by the second wireless device, a message indicating alignment feedback information for the second antenna panel of the second wireless device and a first antenna panel of the first wireless device based on the reference signal.

Figure 9:
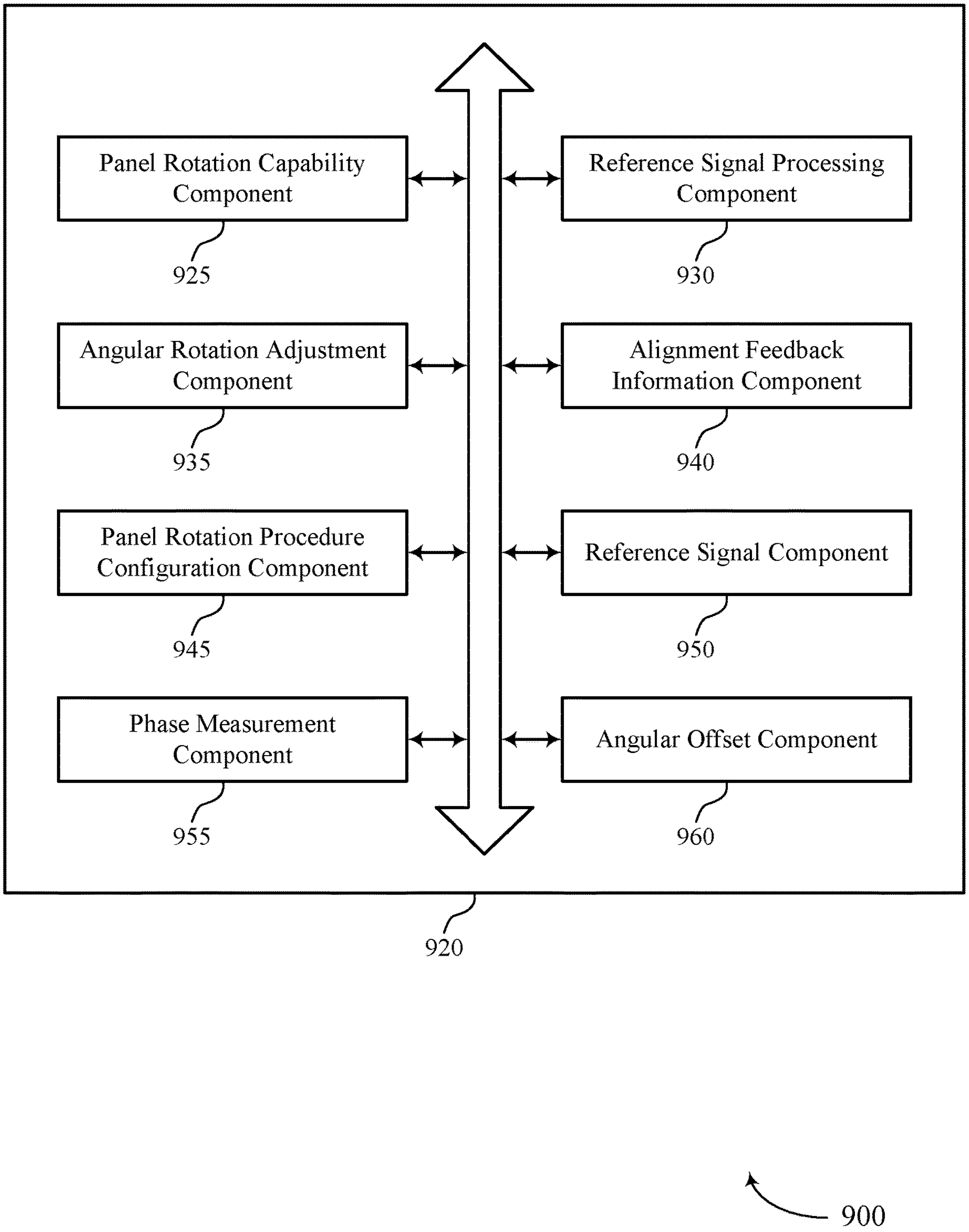
FIG. 9 shows a block diagram of a communications manager that supports rotational alignment for MIMO devices in accordance with one or more aspects of the present disclosure.

FIG. 9 shows a block diagram 900 of a communications manager 920 that supports rotational alignment for MIMO devices in accordance with one or more aspects of the present disclosure. The communications manager 920 may be an example of aspects of a communications manager 720, a communications manager 820, or both, as described herein. The communications manager 920, or various components thereof, may be an example of means for performing various aspects of rotational alignment for MIMO devices as described herein. For example, the communications manager 920 may include a panel rotation capability component 925, a reference signal processing component 930, an angular rotation adjustment component 935, an alignment feedback information component 940, a panel rotation procedure configuration component 945, a reference signal component 950, a phase measurement component 955, an angular offset component 960, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communication at a first wireless device in accordance with examples as disclosed herein. The panel rotation capability component 925 may be configured as or otherwise support a means for communicating signaling between the first wireless device and a second wireless device that indicates that each of the first wireless device and the second wireless device has a panel rotation capability. The reference signal processing component 930 may be configured as or otherwise support a means for receiving, via a first set of two or more antenna elements of a set of multiple antenna elements of a first antenna panel of the first wireless device, a reference signal transmitted by a central antenna element of a second antenna panel of the second wireless device. The angular rotation adjustment component 935 may be configured as or otherwise support a means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The alignment feedback information component 940 may be configured as or otherwise support a means for transmitting, to the second wireless device, a message indicating alignment feedback information for the first antenna panel and the second antenna panel.

In some examples, the panel rotation procedure configuration component 945 may be configured as or otherwise support a means for receiving a configuration message that includes a panel rotation procedure configuration based on the panel rotation capability, where receiving the reference signal may be based on the panel rotation procedure configuration.

In some examples, to support communicating the signaling, the panel rotation capability component 925 may be configured as or otherwise support a means for transmitting a capability message indicating that the first wireless device supports the panel rotation capability, the panel rotation capability associated with a capability to adjust the angular rotation of the first antenna panel.

In some examples, the reference signal processing component 930 may be configured as or otherwise support a means for receiving, via a second set of two or more antenna elements of the set of multiple antenna elements of the first antenna panel, a second reference signal transmitted by the central antenna element of the second wireless device. In some examples, to support adjusting the angular rotation of the first antenna panel, the angular rotation adjustment component 935 may be configured as or otherwise support a means for adjusting, based on second measurements of the second reference signal at the second set of two or more antenna elements, the angular rotation of the first antenna panel to modify a respective second distance between each of the second set of two or more antenna elements of the first antenna panel relative to the central antenna element of the second antenna panel.

In some examples, to support transmitting the message, the alignment feedback information component 940 may be configured as or otherwise support a means for transmitting, via the alignment feedback information, an indication that the first antenna panel is perpendicular with respect to a line connecting a center of the first antenna panel and a center of the second antenna panel. In some examples, to support transmitting the message, the alignment feedback information component 940 may be configured as or otherwise support a means for transmitting, via the alignment feedback information, an indication that the first antenna panel is not perpendicular with respect to a line connecting a center of the first antenna panel and a center of the second antenna panel.

In some examples, the reference signal processing component 930 may be configured as or otherwise support a means for receiving, via the first set of two or more antenna elements of the set of multiple antenna elements of the first antenna panel, a second reference signal transmitted by the central antenna element of the second wireless device based on the alignment feedback information. In some examples, the angular rotation adjustment component 935 may be configured as or otherwise support a means for adjusting, based on second measurements of the second reference signal at the first set of two or more antenna elements, the angular rotation of the first antenna panel to further modify the respective distance between each of the first set of two or more antenna elements of the first antenna panel relative to the central antenna element of the second antenna panel.

In some examples, to support transmitting the message, the phase measurement component 955 may be configured as or otherwise support a means for transmitting, via the alignment feedback information, an indication that a difference between a first phase measurement at a first antenna element of the first set of two or more antenna elements and a second phase measurement at a second antenna element of the first set of two or more antenna elements satisfies a threshold.

In some examples, the first phase measurement may be based on a set of multiple first phase measurements of the reference signal received across one or more frequencies, across a set of one or more first antenna elements of the first antenna panel, or both, the set of one or more first antenna elements including the first antenna element of the first set of two or more antenna elements. In some examples, the second phase measurement may be based on a set of multiple second phase measurements of the reference signal received across the one or more frequencies, across a set of one or more second antenna elements of the first antenna panel, or both, the set of one or more second antenna elements including the second antenna element of the first set of two or more antenna elements.

In some examples, the phase measurement component 955 may be configured as or otherwise support a means for comparing the first phase measurement, the second phase measurement, or both to a phase tolerance threshold, where adjusting the angular rotation of the first antenna panel may be based on the first phase measurement, the second phase measurement, or both satisfying the phase tolerance threshold.

In some examples, the reference signal processing component 930 may be configured as or otherwise support a means for receiving, via at least a first non-central antenna element of the set of multiple antenna elements of the first antenna panel, one or more reference signals transmitted by one or more second non-central antenna elements of the second antenna panel of the second wireless device. In some examples, the angular offset component 960 may be configured as or otherwise support a means for determining, based on the one or more reference signals, a first angle between the first non-central antenna element and a first axis of the first antenna panel and a second angle between a second non-central antenna element of the one or more second non-central antenna elements of the second antenna panel and a second axis of the second antenna panel that is parallel to the first axis, where the first non-central antenna element corresponds to the second non-central antenna element. In some examples, the angular rotation adjustment component 935 may be configured as or otherwise support a means for rotating the first antenna panel around a central point of the first antenna panel to adjust an angular difference between the first angle and the second angle.

In some examples, the alignment feedback information component 940 may be configured as or otherwise support a means for transmitting, to the second wireless device, a second message including second alignment feedback information that indicates whether the angular difference between the first angle and the second angle is less than a threshold angular difference.

In some examples, each antenna element of the set of multiple antenna elements of the first antenna panel at the first wireless device corresponds to a respective second antenna element of a set of multiple second antenna elements of the second antenna panel at the second wireless device. In some examples, rotating the first antenna panel includes modifying one or more angular differences between each pair of a respective first antenna element at the first wireless device and a respective second antenna element at the second wireless device.

In some examples, the reference signal component 950 may be configured as or otherwise support a means for transmitting, via a central antenna element of the first antenna panel at the first wireless device, a second reference signal to the second wireless device. In some examples, the alignment feedback information component 940 may be configured as or otherwise support a means for receiving, from the second wireless device, a second message indicating second alignment feedback information for the first antenna panel and the second antenna panel based on the second reference signal and a panel rotation procedure performed by the second wireless device.

In some examples, a first distance between two antenna elements of the first set of two or more antenna elements may be greater than or equal to a second distance between any other antenna elements of the set of multiple antenna elements within the first antenna panel. In some examples, at least a subset of the set of multiple antenna elements may be disposed in a circular shape or a rectangular shape around a central antenna element of the first antenna panel. In some examples, the first wireless device and the second wireless device support OAM communications, LoS MIMO communications, or both.

Additionally, or alternatively, the communications manager 920 may support wireless communication at a second wireless device in accordance with examples as disclosed herein. In some examples, the panel rotation capability component 925 may be configured as or otherwise support a means for communicating signaling between a first wireless device and a second wireless device that indicates that each of the first wireless device and the second wireless device has a panel rotation capability. The panel rotation procedure configuration component 945 may be configured as or otherwise support a means for communicating, with the first wireless device, a panel rotation procedure configuration based on the panel rotation capability. The reference signal component 950 may be configured as or otherwise support a means for transmitting a reference signal via a central antenna element of a second antenna panel of the second wireless device based on the panel rotation procedure configuration. In some examples, the alignment feedback information component 940 may be configured as or otherwise support a means for receiving, by the second wireless device, a message indicating alignment feedback information for the second antenna panel of the second wireless device and a first antenna panel of the first wireless device based on the reference signal.

In some examples, to support communicating the signaling, the panel rotation capability component 925 may be configured as or otherwise support a means for receiving a capability message indicating that the first wireless device supports the panel rotation capability, the panel rotation capability associated with a capability to adjust an angular rotation of the first antenna panel.

In some examples, the reference signal component 950 may be configured as or otherwise support a means for transmitting, via the central antenna element of the second antenna panel of the second wireless device, a second reference signal. In some examples, the alignment feedback information component 940 may be configured as or otherwise support a means for receiving, via the alignment feedback information based on the reference signal, an indication that the first antenna panel is not perpendicular with respect to a line connecting a center of the first antenna panel and a center of the second antenna panel, where transmitting the second reference signal may be based on the indication that the first antenna panel is not perpendicular to the line.

In some examples, to support receiving the message, the alignment feedback information component 940 may be configured as or otherwise support a means for receiving, via the alignment feedback information based on the reference signal, an indication that the first antenna panel is perpendicular with respect to a line connecting a center of the first antenna panel and a center of the second antenna panel.

In some examples, to support receiving the message, the phase measurement component 955 may be configured as or otherwise support a means for receiving, via the alignment feedback information, an indication that a difference between a first phase measurement at a first antenna element of the first antenna panel of the first wireless device and a second phase measurement at a second antenna element of the first antenna panel of the first wireless device satisfies a threshold.

In some examples, the reference signal component 950 may be configured as or otherwise support a means for transmitting, via one or more second non-central antenna elements of the second antenna panel, one or more reference signals, where each of the one or more second non-central antenna elements corresponds to a respective first non-central antenna element of a set of multiple first non-central antenna elements of the first antenna panel at the first wireless device.

In some examples, the angular offset component 960 may be configured as or otherwise support a means for receiving, by the second wireless device, a second message including second alignment feedback information that indicates whether an angular difference between a first angle associated with a first non-central antenna element of the set of multiple first non-central antenna elements and a second angle associated with a second non-central antenna element of the one or more second non-central antenna elements is less than a threshold angular difference, where the first angle is between the first non-central antenna element and a first axis of the first antenna panel and the second angle is between the second non-central antenna element of the second antenna panel and a second axis of the second antenna panel that is parallel to the first axis, and where the first non-central antenna element corresponds to the second non-central antenna element.

In some examples, the reference signal processing component 930 may be configured as or otherwise support a means for receiving, via a set of two or more antenna elements of the second antenna panel of the second wireless device, a second reference signal transmitted by a central antenna element of the first antenna panel of the first wireless device. In some examples, the angular rotation adjustment component 935 may be configured as or otherwise support a means for adjusting, based on measurements of the second reference signal at the set of two or more antenna elements, an angular rotation of the second antenna panel to modify a respective distance between each of the set of two or more antenna elements of the second antenna panel relative to the central antenna element of the first antenna panel. In some examples, the alignment feedback information component 940 may be configured as or otherwise support a means for transmitting, to the first wireless device, a second message indicating second alignment feedback information for the first antenna panel and the second antenna panel based on adjusting the angular rotation of the second antenna panel.

In some examples, the first wireless device and the second wireless device support OAM communications, LoS MIMO communications, or both.

Figure 10:
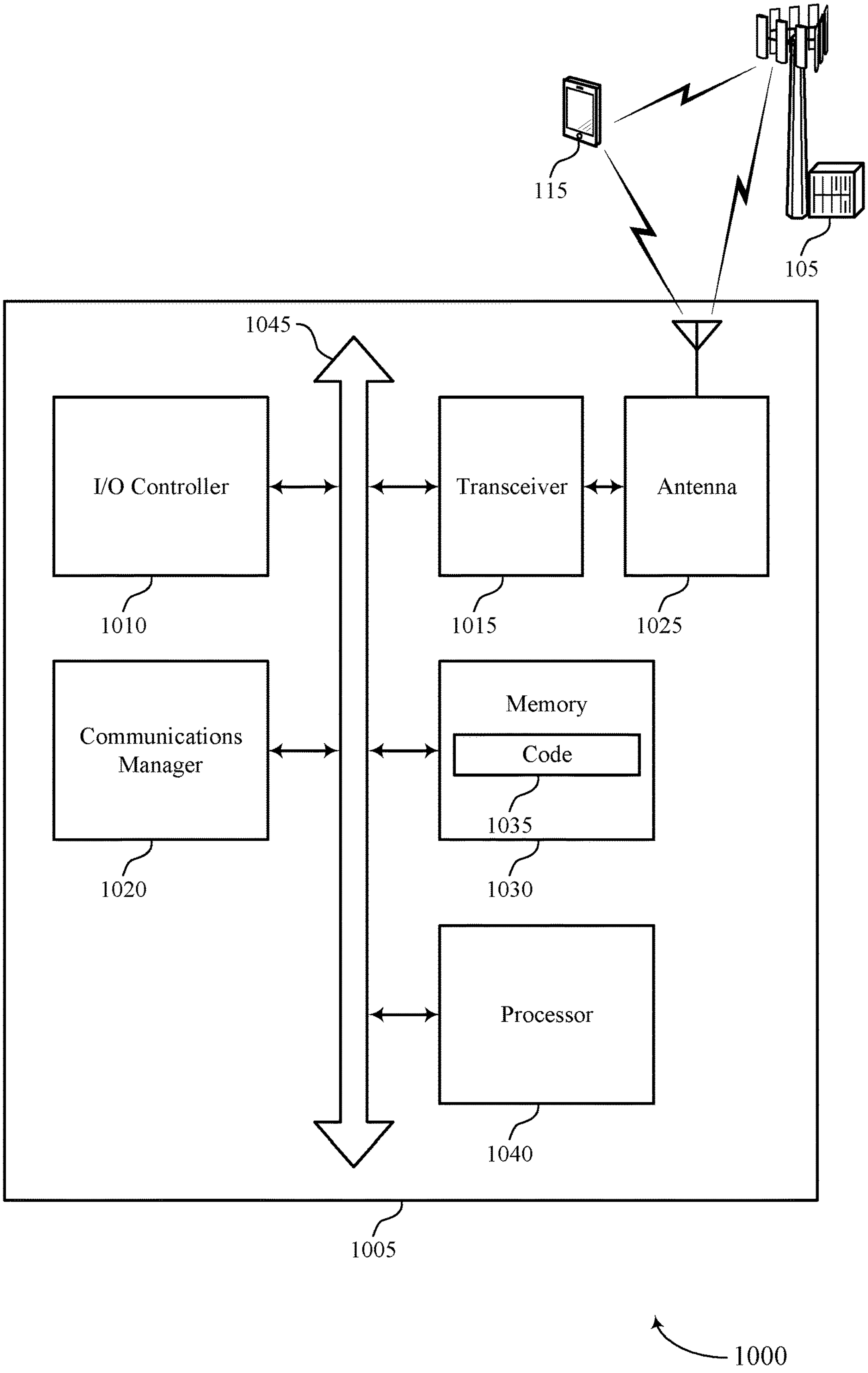
FIG. 10 shows a diagram of a system including a UE that supports rotational alignment for MIMO devices in accordance with one or more aspects of the present disclosure.

FIG. 10 shows a diagram of a system 1000 including a device 1005 that supports rotational alignment for MIMO devices in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting rotational alignment for MIMO devices). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first wireless device in accordance with examples as disclosed herein. For example, the communications manager 1020 may be configured as or otherwise support a means for communicating signaling between the first wireless device and a second wireless device that indicates that each of the first wireless device and the second wireless device has a panel rotation capability. The communications manager 1020 may be configured as or otherwise support a means for receiving, via a first set of two or more antenna elements of a set of multiple antenna elements of a first antenna panel of the first wireless device, a reference signal transmitted by a central antenna element of a second antenna panel of the second wireless device. The communications manager 1020 may be configured as or otherwise support a means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The communications manager 1020 may be configured as or otherwise support a means for transmitting, to the second wireless device, a message indicating alignment feedback information for the first antenna panel and the second antenna panel.

Additionally, or alternatively, the communications manager 1020 may support wireless communication at a second wireless device in accordance with examples as disclosed herein. For example, the communications manager 1020 may be configured as or otherwise support a means for communicating signaling between a first wireless device and a second wireless device that indicates that each of the first wireless device and the second wireless device has a panel rotation capability. The communications manager 1020 may be configured as or otherwise support a means for communicating, with the first wireless device, a panel rotation procedure configuration based on the panel rotation capability. The communications manager 1020 may be configured as or otherwise support a means for transmitting a reference signal via a central antenna element of a second antenna panel of the second wireless device based on the panel rotation procedure configuration. The communications manager 1020 may be configured as or otherwise support a means for receiving, by the second wireless device, a message indicating alignment feedback information for the second antenna panel of the second wireless device and a first antenna panel of the first wireless device based on the reference signal.

By including or configuring the communications manager 1020 in accordance with examples as described herein, the device 1005 may support techniques for improved communication reliability, reduced latency, reduced power consumption, improved coordination between devices, longer battery life, and improved utilization of processing capability. For example, by dynamically adjusting an angular rotation of an antenna panel at the device 1005, the device 1005 may improve throughput and reliability of LoS-MIMO communications with another device. Additionally, or alternatively, the panel rotation procedure described herein may provide for reduced complexity and power consumption as compared with other panel alignment techniques in which at least one of the antenna panels may be fixed.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of rotational alignment for MIMO devices as described herein, or the processor 1040 and the memory 1030 may be otherwise configured to perform or support such operations.

Figure 11:
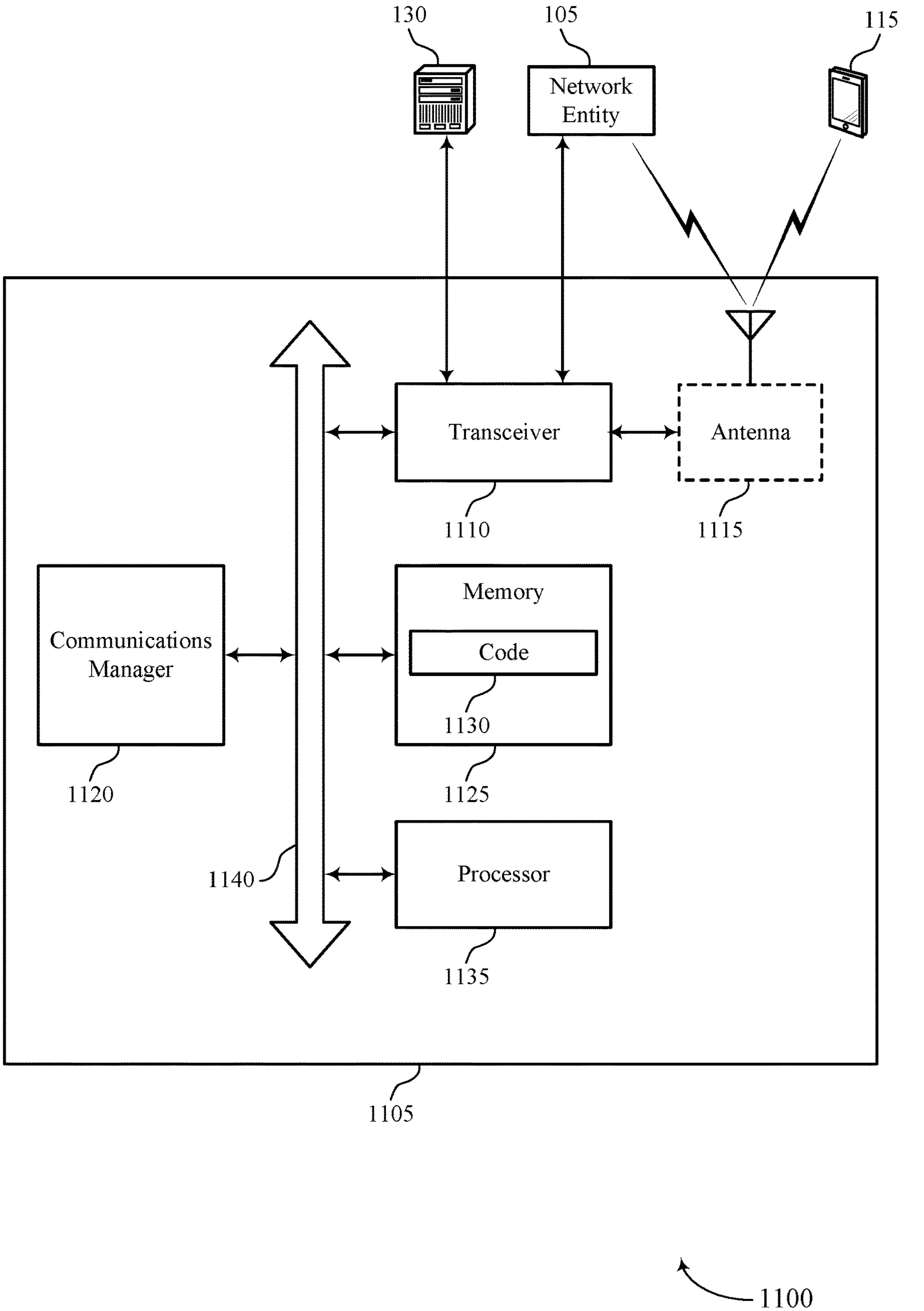
FIG. 11 shows a diagram of a system including a network entity that supports rotational alignment for MIMO devices in accordance with one or more aspects of the present disclosure.

FIG. 11 shows a diagram of a system 1100 including a device 1105 that supports rotational alignment for MIMO devices in accordance with one or more aspects of the present disclosure. The device 1105 may be an example of or include the components of a device 705, a device 805, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting rotational alignment for MIMO devices). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a first wireless device in accordance with examples as disclosed herein. For example, the communications manager 1120 may be configured as or otherwise support a means for communicating signaling between the first wireless device and a second wireless device that indicates that each of the first wireless device and the second wireless device has a panel rotation capability. The communications manager 1120 may be configured as or otherwise support a means for receiving, via a first set of two or more antenna elements of a set of multiple antenna elements of a first antenna panel of the first wireless device, a reference signal transmitted by a central antenna element of a second antenna panel of the second wireless device. The communications manager 1120 may be configured as or otherwise support a means for adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The communications manager 1120 may be configured as or otherwise support a means for transmitting, to the second wireless device, a message indicating alignment feedback information for the first antenna panel and the second antenna panel.

Additionally, or alternatively, the communications manager 1120 may support wireless communication at a second wireless device in accordance with examples as disclosed herein. For example, the communications manager 1120 may be configured as or otherwise support a means for communicating signaling between a first wireless device and a second wireless device that indicates that each of the first wireless device and the second wireless device has a panel rotation capability. The communications manager 1120 may be configured as or otherwise support a means for communicating, with the first wireless device, a panel rotation procedure configuration based on the panel rotation capability. The communications manager 1120 may be configured as or otherwise support a means for transmitting a reference signal via a central antenna element of a second antenna panel of the second wireless device based on the panel rotation procedure configuration. The communications manager 1120 may be configured as or otherwise support a means for receiving, by the second wireless device, a message indicating alignment feedback information for the second antenna panel of the second wireless device and a first antenna panel of the first wireless device based on the reference signal.

By including or configuring the communications manager 1120 in accordance with examples as described herein, the device 1105 may support techniques for improved communication reliability, reduced latency, reduced power consumption, improved coordination between devices, longer battery life, and improved utilization of processing capability. For example, by dynamically adjusting an angular rotation of an antenna panel at the device 1105, the device 1105 may improve throughput and reliability of LoS-MIMO communications with another device. Additionally, or alternatively, the panel rotation procedure described herein may provide for reduced complexity and power consumption as compared with other panel alignment techniques in which at least one of the antenna panels may be fixed.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of rotational alignment for MIMO devices as described herein, or the processor 1135 and the memory 1125 may be otherwise configured to perform or support such operations.

Figure 12:
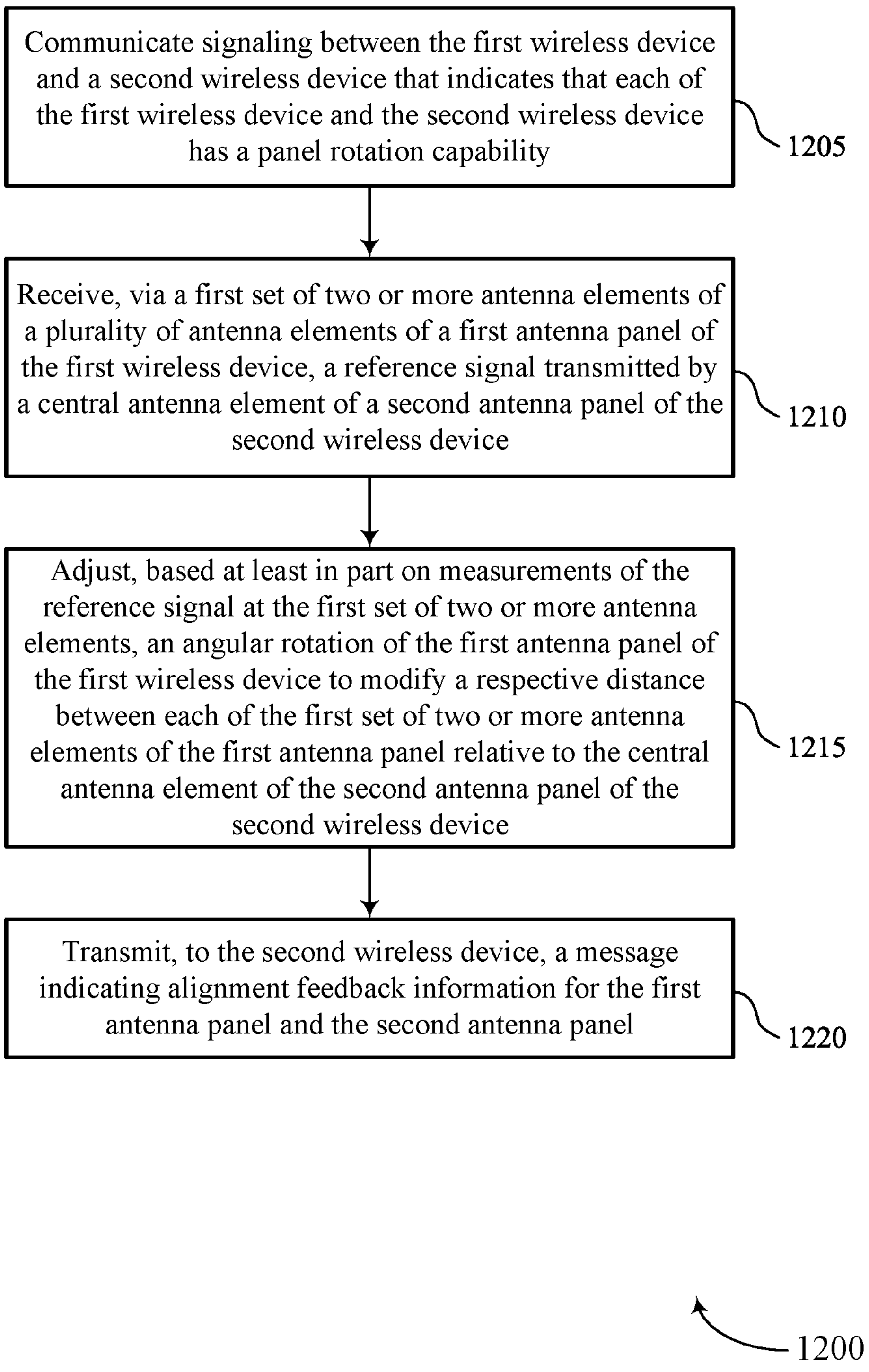
FIGS. 12 through 17 show flowcharts illustrating methods that support rotational alignment for MIMO devices in accordance with one or more aspects of the present disclosure.

FIG. 12 shows a flowchart illustrating a method 1200 that supports rotational alignment for MIMO devices in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include communicating signaling between the first wireless device and a second wireless device that indicates that each of the first wireless device and the second wireless device has a panel rotation capability. The operations of 1205 may be performed in accordance with examples as disclosed herein. In some examples, aspects of the operations of 1205 may be performed by a panel rotation capability component 925 as described with reference to FIG. 9.

At 1210, the method may include receiving, via a first set of two or more antenna elements of a set of multiple antenna elements of a first antenna panel of the first wireless device, a reference signal transmitted by a central antenna element of a second antenna panel of the second wireless device. The operations of 1210 may be performed in accordance with examples as disclosed herein. In some examples, aspects of the operations of 1210 may be performed by a reference signal processing component 930 as described with reference to FIG. 9.

At 1215, the method may include adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The operations of 1215 may be performed in accordance with examples as disclosed herein. In some examples, aspects of the operations of 1215 may be performed by an angular rotation adjustment component 935 as described with reference to FIG. 9.

At 1220, the method may include transmitting, to the second wireless device, a message indicating alignment feedback information for the first antenna panel and the second antenna panel. The operations of 1220 may be performed in accordance with examples as disclosed herein. In some examples, aspects of the operations of 1220 may be performed by an alignment feedback information component 940 as described with reference to FIG. 9.

Figure 13:
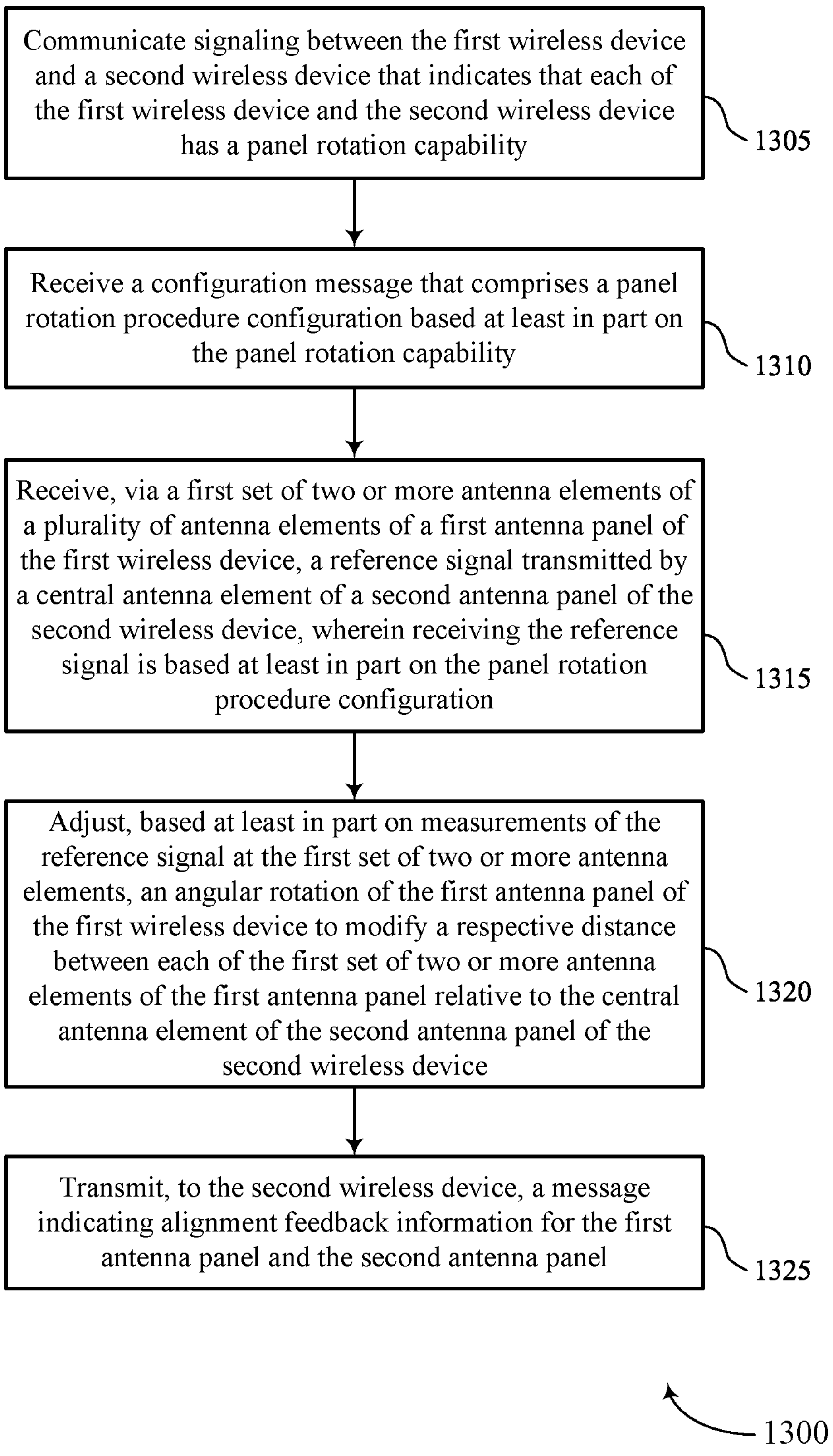

FIG. 13 shows a flowchart illustrating a method 1300 that supports rotational alignment for MIMO devices in accordance with one or more aspects of the present disclosure. The operations of the method 1300 may be implemented by a UE or a network entity or its components as described herein. For example, the operations of the method 1300 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include communicating signaling between the first wireless device and a second wireless device that indicates that each of the first wireless device and the second wireless device has a panel rotation capability. The operations of 1305 may be performed in accordance with examples as disclosed herein. In some examples, aspects of the operations of 1305 may be performed by a panel rotation capability component 925 as described with reference to FIG. 9.

At 1310, the method may include receiving a configuration message that includes a panel rotation procedure configuration based on the panel rotation capability. The operations of 1310 may be performed in accordance with examples as disclosed herein. In some examples, aspects of the operations of 1310 may be performed by a panel rotation procedure configuration component 945 as described with reference to FIG. 9.

At 1315, the method may include receiving, via a first set of two or more antenna elements of a set of multiple antenna elements of a first antenna panel of the first wireless device, a reference signal transmitted by a central antenna element of a second antenna panel of the second wireless device, where receiving the reference signal may be based on the panel rotation procedure configuration. The operations of 1315 may be performed in accordance with examples as disclosed herein. In some examples, aspects of the operations of 1315 may be performed by a reference signal processing component 930 as described with reference to FIG. 9.

At 1320, the method may include adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The operations of 1320 may be performed in accordance with examples as disclosed herein. In some examples, aspects of the operations of 1320 may be performed by an angular rotation adjustment component 935 as described with reference to FIG. 9.

At 1325, the method may include transmitting, to the second wireless device, a message indicating alignment feedback information for the first antenna panel and the second antenna panel. The operations of 1325 may be performed in accordance with examples as disclosed herein. In some examples, aspects of the operations of 1325 may be performed by an alignment feedback information component 940 as described with reference to FIG. 9.

Figure 14:
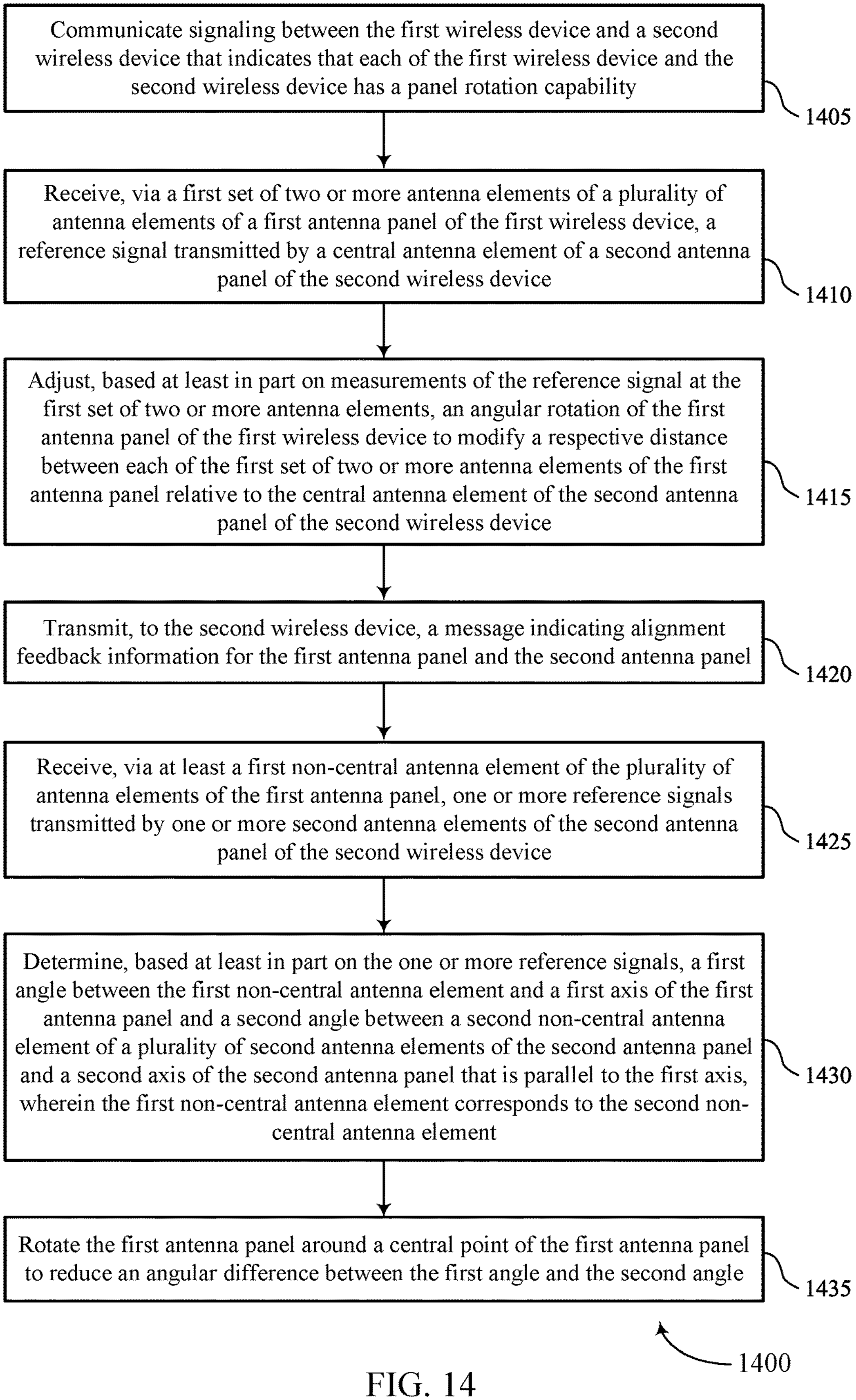

FIG. 14 shows a flowchart illustrating a method 1400 that supports rotational alignment for MIMO devices in accordance with one or more aspects of the present disclosure. The operations of the method 1400 may be implemented by a UE or a network entity or its components as described herein. For example, the operations of the method 1400 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include communicating signaling between the first wireless device and a second wireless device that indicates that each of the first wireless device and the second wireless device has a panel rotation capability. The operations of 1405 may be performed in accordance with examples as disclosed herein. In some examples, aspects of the operations of 1405 may be performed by a panel rotation capability component 925 as described with reference to FIG. 9.

At 1410, the method may include receiving, via a first set of two or more antenna elements of a set of multiple antenna elements of a first antenna panel of the first wireless device, a reference signal transmitted by a central antenna element of a second antenna panel of the second wireless device. The operations of 1410 may be performed in accordance with examples as disclosed herein. In some examples, aspects of the operations of 1410 may be performed by a reference signal processing component 930 as described with reference to FIG. 9.

At 1415, the method may include adjusting, based on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device. The operations of 1415 may be performed in accordance with examples as disclosed herein. In some examples, aspects of the operations of 1415 may be performed by an angular rotation adjustment component 935 as described with reference to FIG. 9.

At 1420, the method may include transmitting, to the second wireless device, a message indicating alignment feedback information for the first antenna panel and the second antenna panel. The operations of 1420 may be performed in accordance with examples as disclosed herein. In some examples, aspects of the operations of 1420 may be performed by an alignment feedback information component 940 as described with reference to FIG. 9.

At 1425, the method may include receiving, via at least a first non-central antenna element of the set of multiple antenna elements of the first antenna panel, one or more reference signals transmitted by one or more second antenna elements of the second antenna panel of the second wireless device. The operations of 1425 may be performed in accordance with examples as disclosed herein. In some examples, aspects of the operations of 1425 may be performed by a reference signal processing component 930 as described with reference to FIG. 9.

At 1430, the method may include determining, based on the one or more reference signals, a first angle between the first non-central antenna element and a first axis of the first antenna panel and a second angle between a second non-central antenna element of a set of multiple second antenna elements of the second antenna panel and a second axis of the second antenna panel that is parallel to the first axis, where the first non-central antenna element corresponds to the second non-central antenna element. The operations of 1430 may be performed in accordance with examples as disclosed herein. In some examples, aspects of the operations of 1430 may be performed by an angular offset component 960 as described with reference to FIG. 9.

At 1435, the method may include rotating the first antenna panel around a central point of the first antenna panel to reduce an angular difference between the first angle and the second angle. The operations of 1435 may be performed in accordance with examples as disclosed herein. In some examples, aspects of the operations of 1435 may be performed by an angular rotation adjustment component 935 as described with reference to FIG. 9.

Figure 15:
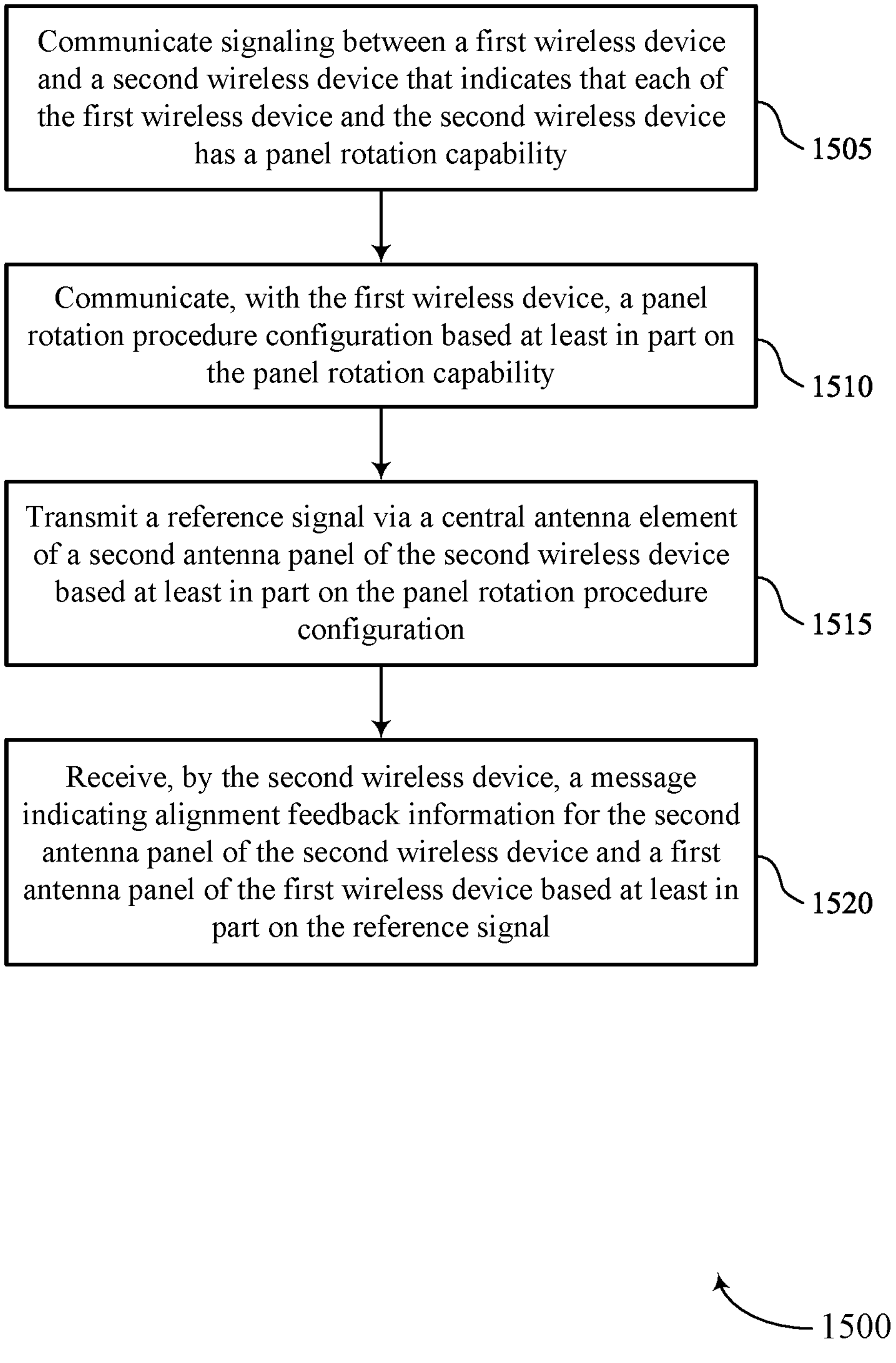

FIG. 15 shows a flowchart illustrating a method 1500 that supports rotational alignment for MIMO devices in accordance with one or more aspects of the present disclosure. The operations of the method 1500 may be implemented by a UE or a network entity or its components as described herein. For example, the operations of the method 1500 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include communicating signaling between a first wireless device and a second wireless device that indicates that each of the first wireless device and the second wireless device has a panel rotation capability. The operations of 1505 may be performed in accordance with examples as disclosed herein. In some examples, aspects of the operations of 1505 may be performed by a panel rotation capability component 925 as described with reference to FIG. 9.

At 1510, the method may include communicating, with the first wireless device, a panel rotation procedure configuration based on the panel rotation capability. The operations of 1510 may be performed in accordance with examples as disclosed herein. In some examples, aspects of the operations of 1510 may be performed by a panel rotation procedure configuration component 945 as described with reference to FIG. 9.

At 1515, the method may include transmitting a reference signal via a central antenna element of a second antenna panel of the second wireless device based on the panel rotation procedure configuration. The operations of 1515 may be performed in accordance with examples as disclosed herein. In some examples, aspects of the operations of 1515 may be performed by a reference signal component 950 as described with reference to FIG. 9.

At 1520, the method may include receiving, by the second wireless device, a message indicating alignment feedback information for the second antenna panel of the second wireless device and a first antenna panel of the first wireless device based on the reference signal. The operations of 1520 may be performed in accordance with examples as disclosed herein. In some examples, aspects of the operations of 1520 may be performed by an alignment feedback information component 940 as described with reference to FIG. 9.

Figure 16:
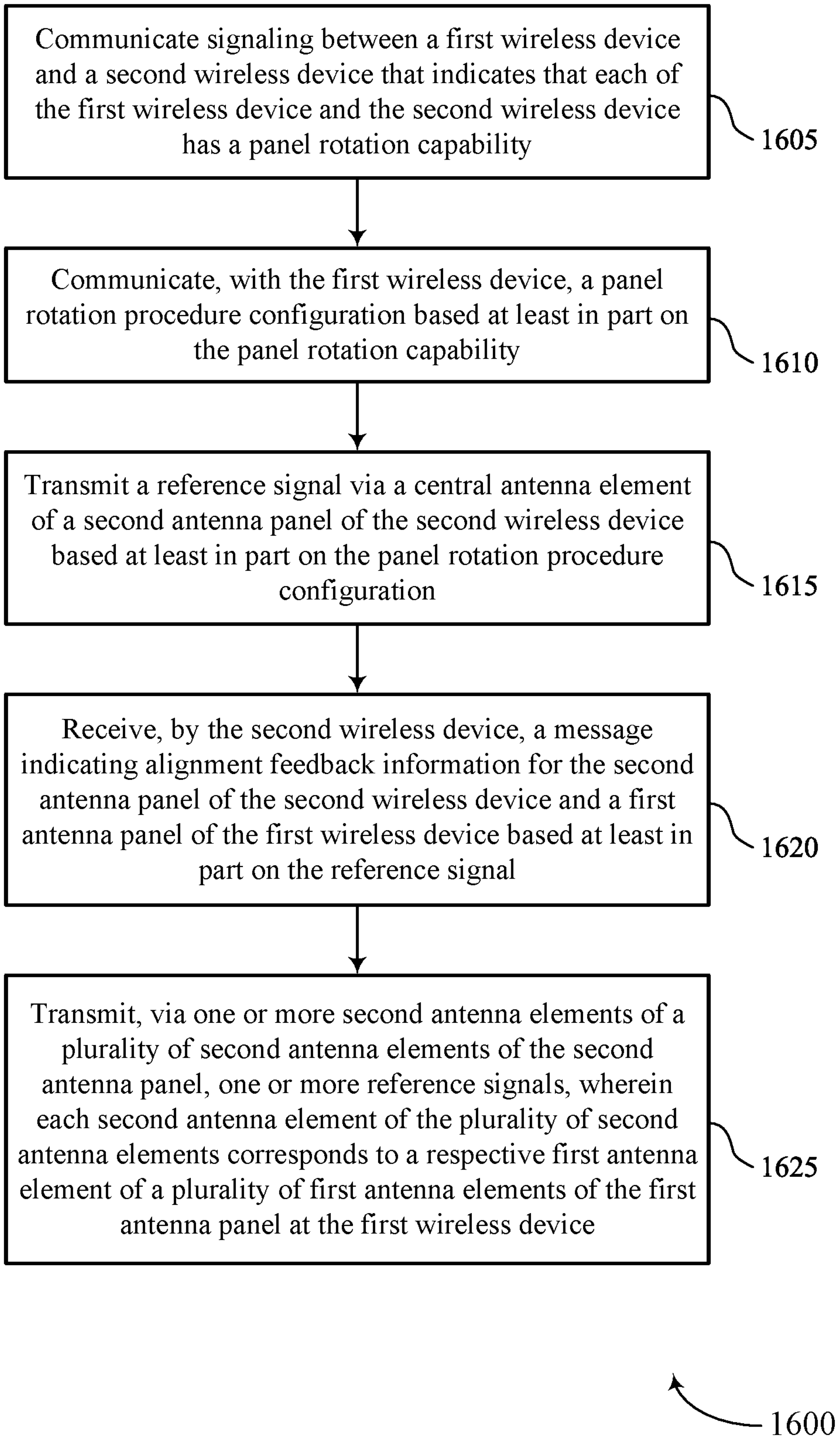

FIG. 16 shows a flowchart illustrating a method 1600 that supports rotational alignment for MIMO devices in accordance with one or more aspects of the present disclosure. The operations of the method 1600 may be implemented by a UE or a network entity or its components as described herein. For example, the operations of the method 1600 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include communicating signaling between a first wireless device and a second wireless device that indicates that each of the first wireless device and the second wireless device has a panel rotation capability. The operations of 1605 may be performed in accordance with examples as disclosed herein. In some examples, aspects of the operations of 1605 may be performed by a panel rotation capability component 925 as described with reference to FIG. 9.

At 1610, the method may include communicating, with the first wireless device, a panel rotation procedure configuration based on the panel rotation capability. The operations of 1610 may be performed in accordance with examples as disclosed herein. In some examples, aspects of the operations of 1610 may be performed by a panel rotation procedure configuration component 945 as described with reference to FIG. 9.

At 1615, the method may include transmitting a reference signal via a central antenna element of a second antenna panel of the second wireless device based on the panel rotation procedure configuration. The operations of 1615 may be performed in accordance with examples as disclosed herein. In some examples, aspects of the operations of 1615 may be performed by a reference signal component 950 as described with reference to FIG. 9.

At 1620, the method may include receiving, by the second wireless device, a message indicating alignment feedback information for the second antenna panel of the second wireless device and a first antenna panel of the first wireless device based on the reference signal. The operations of 1620 may be performed in accordance with examples as disclosed herein. In some examples, aspects of the operations of 1620 may be performed by an alignment feedback information component 940 as described with reference to FIG. 9.

At 1625, the method may include transmitting, via one or more second antenna elements of a set of multiple second antenna elements of the second antenna panel, one or more reference signals, where each second antenna element of the set of multiple second antenna elements corresponds to a respective first antenna element of a set of multiple first antenna elements of the first antenna panel at the first wireless device. The operations of 1625 may be performed in accordance with examples as disclosed herein. In some examples, aspects of the operations of 1625 may be performed by a reference signal component 950 as described with reference to FIG. 9.

Figure 17:
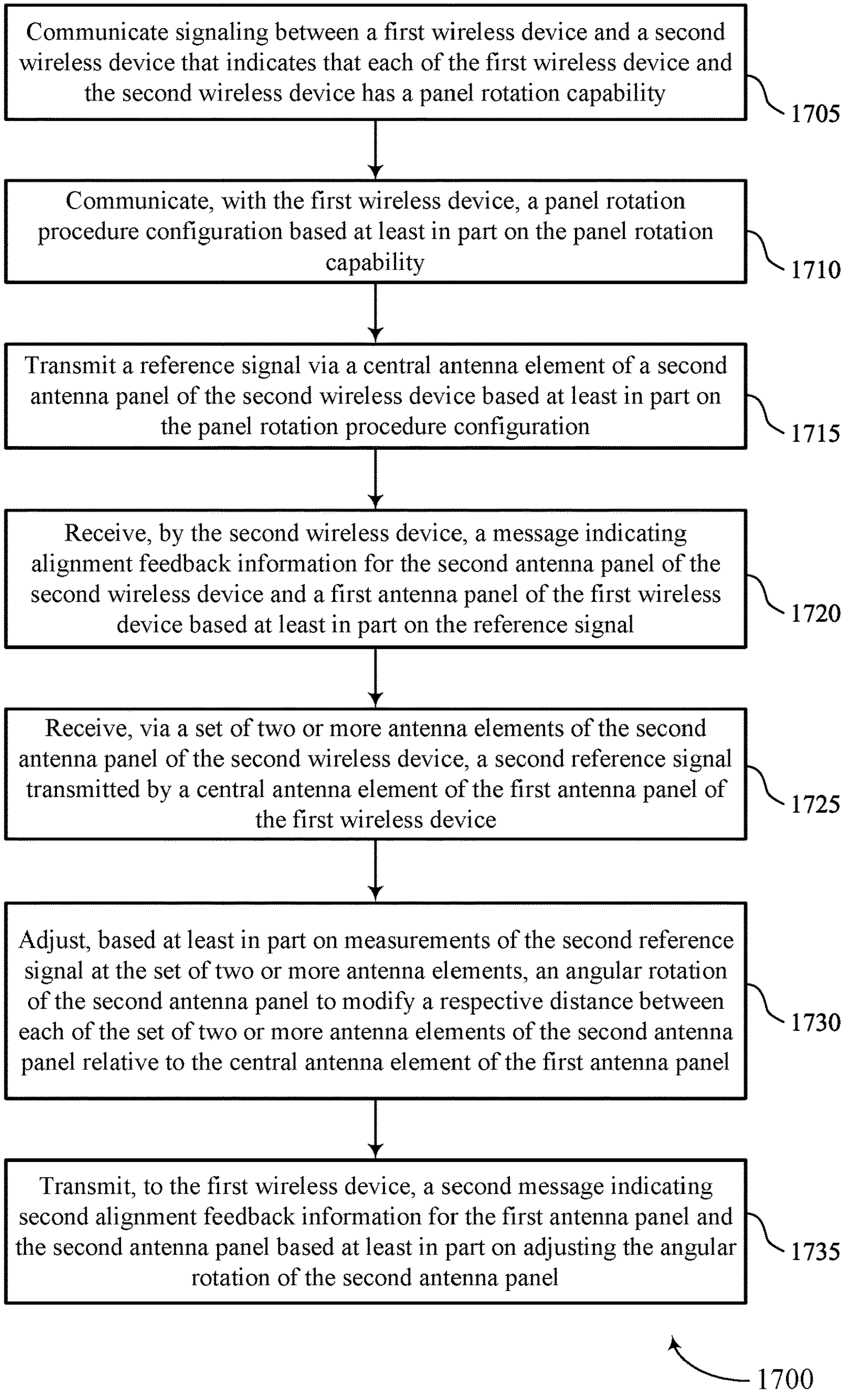

FIG. 17 shows a flowchart illustrating a method 1700 that supports rotational alignment for MIMO devices in accordance with one or more aspects of the present disclosure. The operations of the method 1700 may be implemented by a UE or a network entity or its components as described herein. For example, the operations of the method 1700 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include communicating signaling between a first wireless device and a second wireless device that indicates that each of the first wireless device and the second wireless device has a panel rotation capability. The operations of 1705 may be performed in accordance with examples as disclosed herein. In some examples, aspects of the operations of 1705 may be performed by a panel rotation capability component 925 as described with reference to FIG. 9.

At 1710, the method may include communicating, with the first wireless device, a panel rotation procedure configuration based on the panel rotation capability. The operations of 1710 may be performed in accordance with examples as disclosed herein. In some examples, aspects of the operations of 1710 may be performed by a panel rotation procedure configuration component 945 as described with reference to FIG. 9.

At 1715, the method may include transmitting a reference signal via a central antenna element of a second antenna panel of the second wireless device based on the panel rotation procedure configuration. The operations of 1715 may be performed in accordance with examples as disclosed herein. In some examples, aspects of the operations of 1715 may be performed by a reference signal component 950 as described with reference to FIG. 9.

At 1720, the method may include receiving, by the second wireless device, a message indicating alignment feedback information for the second antenna panel of the second wireless device and a first antenna panel of the first wireless device based on the reference signal. The operations of 1720 may be performed in accordance with examples as disclosed herein. In some examples, aspects of the operations of 1720 may be performed by an alignment feedback information component 940 as described with reference to FIG. 9.

At 1725, the method may include receiving, via a set of two or more antenna elements of the second antenna panel of the second wireless device, a second reference signal transmitted by a central antenna element of the first antenna panel of the first wireless device. The operations of 1725 may be performed in accordance with examples as disclosed herein. In some examples, aspects of the operations of 1725 may be performed by a reference signal processing component 930 as described with reference to FIG. 9.

At 1730, the method may include adjusting, based on measurements of the second reference signal at the set of two or more antenna elements, an angular rotation of the second antenna panel to modify a respective distance between each of the set of two or more antenna elements of the second antenna panel relative to the central antenna element of the first antenna panel. The operations of 1730 may be performed in accordance with examples as disclosed herein. In some examples, aspects of the operations of 1730 may be performed by an angular rotation adjustment component 935 as described with reference to FIG. 9.

At 1735, the method may include transmitting, to the first wireless device, a second message indicating second alignment feedback information for the first antenna panel and the second antenna panel based on adjusting the angular rotation of the second antenna panel. The operations of 1735 may be performed in accordance with examples as disclosed herein. In some examples, aspects of the operations of 1735 may be performed by an alignment feedback information component 940 as described with reference to FIG. 9.

The following provides an overview of aspects of the present disclosure:

Aspect 1: A method for wireless communication at a first wireless device, comprising: communicating signaling between the first wireless device and a second wireless device that indicates that each of the first wireless device and the second wireless device has a panel rotation capability; receiving, via a first set of two or more antenna elements of a plurality of antenna elements of a first antenna panel of the first wireless device, a reference signal transmitted by a central antenna element of a second antenna panel of the second wireless device; adjusting, based at least in part on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device; and transmitting, to the second wireless device, a message indicating alignment feedback information for the first antenna panel and the second antenna panel.

Aspect 2: The method of aspect 1, further comprising: receiving a configuration message that comprises a panel rotation procedure configuration based at least in part on the panel rotation capability, wherein receiving the reference signal is based at least in part on the panel rotation procedure configuration.

Aspect 3: The method of any of aspects 1 through 2, wherein communicating the signaling comprises: transmitting a capability message indicating that the first wireless device supports the panel rotation capability, the panel rotation capability associated with a capability to adjust the angular rotation of the first antenna panel.

Aspect 4: The method of any of aspects 1 through 3, further comprising: receiving, via a second set of two or more antenna elements of the plurality of antenna elements of the first antenna panel, a second reference signal transmitted by the central antenna element of the second wireless device, wherein adjusting the angular rotation of the first antenna panel further comprises: adjusting, based at least in part on second measurements of the second reference signal at the second set of two or more antenna elements, the angular rotation of the first antenna panel to modify a respective second distance between each of the second set of two or more antenna elements of the first antenna panel relative to the central antenna element of the second antenna panel.

Aspect 5: The method of any of aspects 1 through 4, wherein transmitting the message comprises: transmitting, via the alignment feedback information, an indication that the first antenna panel is perpendicular with respect to a line connecting a center of the first antenna panel and a center of the second antenna panel.

Aspect 6: The method of any of aspects 1 through 4, wherein transmitting the message comprises: transmitting, via the alignment feedback information, an indication that the first antenna panel is not perpendicular with respect to a line connecting a center of the first antenna panel and a center of the second antenna panel.

Aspect 7: The method of aspect 6, further comprising: receiving, via the first set of two or more antenna elements of the plurality of antenna elements of the first antenna panel, a second reference signal transmitted by the central antenna element of the second wireless device based at least in part on the alignment feedback information; and adjusting, based at least in part on second measurements of the second reference signal at the first set of two or more antenna elements, the angular rotation of the first antenna panel to further modify the respective distance between each of the first set of two or more antenna elements of the first antenna panel relative to the central antenna element of the second antenna panel.

Aspect 8: The method of any of aspects 1 through 4, wherein transmitting the message comprises: transmitting, via the alignment feedback information, an indication that a difference between a first phase measurement at a first antenna element of the first set of two or more antenna elements and a second phase measurement at a second antenna element of the first set of two or more antenna elements satisfies a threshold.

Aspect 9: The method of aspect 8, wherein: the first phase measurement is based at least in part on a plurality of first phase measurements of the reference signal received across one or more frequencies, across a set of one or more first antenna elements of the first antenna panel, or both, the set of one or more first antenna elements comprising the first antenna element of the first set of two or more antenna elements; and the second phase measurement is based at least in part on a plurality of second phase measurements of the reference signal received across the one or more frequencies, across a set of one or more second antenna elements of the first antenna panel, or both, the set of one or more second antenna elements comprising the second antenna element of the first set of two or more antenna elements.

Aspect 10: The method of any of aspects 8 through 9, further comprising: comparing the first phase measurement, the second phase measurement, or both to a phase tolerance threshold, wherein adjusting the angular rotation of the first antenna panel is based at least in part on the first phase measurement, the second phase measurement, or both satisfying the phase tolerance threshold.

Aspect 11: The method of any of aspects 1 through 10, further comprising: receiving, via at least a first non-central antenna element of the plurality of antenna elements of the first antenna panel, one or more reference signals transmitted by one or more second non-central antenna elements of the second antenna panel of the second wireless device; determining, based at least in part on the one or more reference signals, a first angle between the first non-central antenna element and a first axis of the first antenna panel and a second angle between a second non-central antenna element of the one or more second non-central antenna elements of the second antenna panel and a second axis of the second antenna panel that is parallel to the first axis, wherein the first non-central antenna element corresponds to the second non-central antenna element; and rotating the first antenna panel around a central point of the first antenna panel to adjust an angular difference between the first angle and the second angle.

Aspect 12: The method of aspect 11, further comprising: transmitting, to the second wireless device, a second message comprising second alignment feedback information that indicates whether the angular difference between the first angle and the second angle is less than a threshold angular difference.

Aspect 13: The method of any of aspects 11 through 12, wherein: each antenna element of the plurality of antenna elements of the first antenna panel at the first wireless device corresponds to a respective second antenna element of a plurality of second antenna elements of the second antenna panel at the second wireless device; and rotating the first antenna panel includes modifying one or more angular differences between each pair of a respective first antenna element at the first wireless device and a respective second antenna element at the second wireless device.

Aspect 14: The method of any of aspects 1 through 13, further comprising: transmitting, via a central antenna element of the first antenna panel at the first wireless device, a second reference signal to the second wireless device; and receiving, from the second wireless device, a second message indicating second alignment feedback information for the first antenna panel and the second antenna panel based at least in part on the second reference signal and a panel rotation procedure performed by the second wireless device.

Aspect 15: The method of any of aspects 1 through 14, wherein a first distance between two antenna elements of the first set of two or more antenna elements is greater than or equal to a second distance between any other antenna elements of the plurality of antenna elements within the first antenna panel.

Aspect 16: The method of any of aspects 1 through 15, wherein at least a subset of the plurality of antenna elements are disposed in a circular shape or a rectangular shape around a central antenna element of the first antenna panel.

Aspect 17: The method of any of aspects 1 through 16, wherein the first wireless device and the second wireless device support OAM communications, LoS-MIMO communications, or both.

Aspect 18: A method for wireless communication at a second wireless device, comprising: communicating signaling between a first wireless device and a second wireless device that indicates that each of the first wireless device and the second wireless device has a panel rotation capability; communicating, with the first wireless device, a panel rotation procedure configuration based at least in part on the panel rotation capability; transmitting a reference signal via a central antenna element of a second antenna panel of the second wireless device based at least in part on the panel rotation procedure configuration; and receiving, by the second wireless device, a message indicating alignment feedback information for the second antenna panel of the second wireless device and a first antenna panel of the first wireless device based at least in part on the reference signal.

Aspect 19: The method of aspect 18, wherein communicating the signaling comprises: receiving a capability message indicating that the first wireless device supports the panel rotation capability, the panel rotation capability associated with a capability to adjust an angular rotation of the first antenna panel.

Aspect 20: The method of any of aspects 18 through 19, further comprising: transmitting, via the central antenna element of the second antenna panel of the second wireless device, a second reference signal.

Aspect 21: The method of aspect 20, wherein receiving the message comprises: receiving, via the alignment feedback information based at least in part on the reference signal, an indication that the first antenna panel is not perpendicular with respect to a line connecting a center of the first antenna panel and a center of the second antenna panel, wherein transmitting the second reference signal is based at least in part on the indication that the first antenna panel is not perpendicular to the line.

Aspect 22: The method of any of aspects 18 through 20, wherein receiving the message comprises: receiving, via the alignment feedback information based at least in part on the reference signal, an indication that the first antenna panel is perpendicular to a line connecting a center of the first antenna panel and a center of the second antenna panel.

Aspect 23: The method of any of aspects 18 through 20, wherein receiving the message comprises: receiving, via the alignment feedback information, an indication that a difference between a first phase measurement at a first antenna element of the first antenna panel of the first wireless device and a second phase measurement at a second antenna element of the first antenna panel of the first wireless device satisfies a threshold.

Aspect 24: The method of any of aspects 18 through 23, further comprising: transmitting, via one or more second non-central antenna elements of the second antenna panel, one or more reference signals, wherein each of the one or more second non-central antenna elements corresponds to a respective first non-central antenna element of a plurality of first non-central antenna elements of the first antenna panel at the first wireless device; and receiving, by the second wireless device, a second message comprising second alignment feedback information that indicates whether an angular difference between a first angle associated with a first non-central antenna element of the plurality of first non-central antenna elements and a second angle associated with a second non-central antenna element of the one or more second non-central antenna elements is less than a threshold angular difference, wherein the first angle is between the first non-central antenna element and a first axis of the first antenna panel and the second angle is between the second non-central antenna element of the second antenna panel and a second axis of the second antenna panel that is parallel to the first axis, and wherein the first non-central antenna element corresponds to the second non-central antenna element.

Aspect 25: The method of any of aspects 18 through 24, further comprising: receiving, via a set of two or more antenna elements of the second antenna panel of the second wireless device, a second reference signal transmitted by a central antenna element of the first antenna panel of the first wireless device; adjusting, based at least in part on measurements of the second reference signal at the set of two or more antenna elements, an angular rotation of the second antenna panel to modify a respective distance between each of the set of two or more antenna elements of the second antenna panel relative to the central antenna element of the first antenna panel; and transmitting, to the first wireless device, a second message indicating second alignment feedback information for the first antenna panel and the second antenna panel based at least in part on adjusting the angular rotation of the second antenna panel.

Aspect 26: An apparatus for wireless communication at a first wireless device, comprising a processor; memory coupled with the processor; and instructions stored in the memory and executable by the processor to cause the apparatus to perform a method of any of aspects 1 through 17.

Aspect 27: An apparatus for wireless communication at a first wireless device, comprising at least one means for performing a method of any of aspects 1 through 17.

Aspect 28: A non-transitory computer-readable medium storing code for wireless communication at a first wireless device, the code comprising instructions executable by a processor to perform a method of any of aspects 1 through 17.

Aspect 29: An apparatus for wireless communication at a second wireless device, comprising a processor; memory coupled with the processor; and instructions stored in the memory and executable by the processor to cause the apparatus to perform a method of any of aspects 18 through 25.

Aspect 30: An apparatus for wireless communication at a second wireless device, comprising at least one means for performing a method of any of aspects 18 through 25.

Aspect 31: A non-transitory computer-readable medium storing code for wireless communication at a second wireless device, the code comprising instructions executable by a processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:

transmitting a first capability message indicating that the first wireless device supports a panel rotation capability;

receiving a second capability message indicating that a second wireless device supports the panel rotation capability, the panel rotation capability associated with a capability of a respective wireless device to adjust an angular rotation of an antenna panel of the respective wireless device;

receiving a configuration message that comprises a panel rotation procedure configuration based at least in part on the panel rotation capability, wherein the panel rotation procedure configuration comprises scheduling information for one or more reference signals;

receiving, via a first set of two or more antenna elements of a plurality of antenna elements of a first antenna panel of the first wireless device, a reference signal of the one or more reference signals based at least in part on the panel rotation procedure configuration, wherein the reference signal is transmitted by a central antenna element of a second antenna panel of the second wireless device;

adjusting, based at least in part on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device; and transmitting, to the second wireless device, a message indicating alignment feedback information for the first antenna panel and the second antenna panel.

2. The method of claim 1, further comprising:

receiving, via a second set of two or more antenna elements of the plurality of antenna elements of the first antenna panel, a second reference signal transmitted by the central antenna element of the second wireless device, wherein adjusting the angular rotation of the first antenna panel further comprises:

adjusting, based at least in part on second measurements of the second reference signal at the second set of two or more antenna elements, the angular rotation of the first antenna panel to modify a respective second distance between each of the second set of two or more antenna elements of the first antenna panel relative to the central antenna element of the second antenna panel.

3. The method of claim 1, wherein transmitting the message comprises:

transmitting, via the alignment feedback information, an indication that the first antenna panel is perpendicular with respect to a line connecting a center of the first antenna panel and a center of the second antenna panel.

4. The method of claim 1, wherein transmitting the message comprises:

transmitting, via the alignment feedback information, an indication that the first antenna panel is not perpendicular with respect to a line connecting a center of the first antenna panel and a center of the second antenna panel.

5. The method of claim 4, further comprising:

receiving, via the first set of two or more antenna elements of the plurality of antenna elements of the first antenna panel, a second reference signal transmitted by the central antenna element of the second wireless device based at least in part on the alignment feedback information; and adjusting, based at least in part on second measurements of the second reference signal at the first set of two or more antenna elements, the angular rotation of the first antenna panel to further modify the respective distance between each of the first set of two or more antenna elements of the first antenna panel relative to the central antenna element of the second antenna panel.

6. The method of claim 1, wherein transmitting the message comprises:

transmitting, via the alignment feedback information, an indication that a difference between a first phase measurement at a first antenna element of the first set of two or more antenna elements and a second phase measurement at a second antenna element of the first set of two or more antenna elements satisfies a threshold.

7. The method of claim 6, wherein:

the first phase measurement is based at least in part on a plurality of first phase measurements of the reference signal received across one or more frequencies, across a set of one or more first antenna elements of the first antenna panel, or both, the set of one or more first antenna elements comprising the first antenna element of the first set of two or more antenna elements; and the second phase measurement is based at least in part on a plurality of second phase measurements of the reference signal received across the one or more frequencies, across a set of one or more second antenna elements of the first antenna panel, or both, the set of one or more second antenna elements comprising the second antenna element of the first set of two or more antenna elements.

8. The method of claim 6, further comprising:

comparing the first phase measurement, the second phase measurement, or both to a phase tolerance threshold, wherein adjusting the angular rotation of the first antenna panel is based at least in part on the first phase measurement, the second phase measurement, or both satisfying the phase tolerance threshold.

9. The method of claim 1, further comprising:

receiving, via at least a first non-central antenna element of the plurality of antenna elements of the first antenna panel, one or more reference signals transmitted by one or more second non-central antenna elements of the second antenna panel of the second wireless device;

determining, based at least in part on the one or more reference signals, a first angle between the first non-central antenna element and a first axis of the first antenna panel and a second angle between a second non-central antenna element of the one or more second non-central antenna elements of the second antenna panel and a second axis of the second antenna panel that is parallel to the first axis, wherein the first non-central antenna element corresponds to the second non-central antenna element; and rotating the first antenna panel around a central point of the first antenna panel to adjust an angular difference between the first angle and the second angle.

10. The method of claim 9, further comprising:

transmitting, to the second wireless device, a second message comprising second alignment feedback information that indicates whether the angular difference between the first angle and the second angle is less than a threshold angular difference.

11. The method of claim 9, wherein:

each antenna element of the plurality of antenna elements of the first antenna panel at the first wireless device corresponds to a respective second antenna element of a plurality of second antenna elements of the second antenna panel at the second wireless device; and rotating the first antenna panel includes modifying one or more angular differences between each pair of a respective first antenna element at the first wireless device and a respective second antenna element at the second wireless device.

12. The method of claim 1, further comprising:

transmitting, via a central antenna element of the first antenna panel at the first wireless device, a second reference signal to the second wireless device; and receiving, from the second wireless device, a second message indicating second alignment feedback information for the first antenna panel and the second antenna panel based at least in part on the second reference signal and a panel rotation procedure performed by the second wireless device.

13. The method of claim 1, wherein a first distance between two antenna elements of the first set of two or more antenna elements is greater than or equal to a second distance between any other antenna elements of the plurality of antenna elements within the first antenna panel.

14. The method of claim 1, wherein at least a subset of the plurality of antenna elements are disposed in a circular shape or a rectangular shape around a central antenna element of the first antenna panel.

15. The method of claim 1, wherein the first wireless device and the second wireless device support orbital angular momentum communications, line-of-sight multiple-input multiple-output communications, or both.

16. A method for wireless communication at a second wireless device, comprising:

transmitting a first capability message indicating that the second wireless device supports a panel rotation capability;

receiving a second capability message indicating that a first wireless device supports the panel rotation capability, the panel rotation capability associated with a capability of a respective wireless device to adjust an angular rotation of an antenna panel of the respective wireless device;

communicating, with the first wireless device, a panel rotation procedure configuration based at least in part on the panel rotation capability, wherein the panel rotation procedure configuration comprises scheduling information for one or more reference signals;

transmitting a reference signal of the one or more reference signals via a central antenna element of a second antenna panel of the second wireless device based at least in part on the panel rotation procedure configuration; and receiving, by the second wireless device, a message indicating alignment feedback information for the second antenna panel of the second wireless device and a first antenna panel of the first wireless device based at least in part on the reference signal.

17. The method of claim 16, further comprising:

transmitting, via the central antenna element of the second antenna panel of the second wireless device, a second reference signal.

18. The method of claim 17, wherein receiving the message comprises:

receiving, via the alignment feedback information based at least in part on the reference signal, an indication that the first antenna panel is not perpendicular with respect to a line connecting a center of the first antenna panel and a center of the second antenna panel, wherein transmitting the second reference signal is based at least in part on the indication that the first antenna panel is not perpendicular to the line.

19. The method of claim 16, wherein receiving the message comprises:

receiving, via the alignment feedback information based at least in part on the reference signal, an indication that the first antenna panel is perpendicular to a line connecting a center of the first antenna panel and a center of the second antenna panel.

20. The method of claim 16, wherein receiving the message comprises:

receiving, via the alignment feedback information, an indication that a difference between a first phase measurement at a first antenna element of the first antenna panel of the first wireless device and a second phase measurement at a second antenna element of the first antenna panel of the first wireless device satisfies a threshold.

21. The method of claim 16, further comprising:

transmitting, via one or more second non-central antenna elements of the second antenna panel, one or more reference signals, wherein each of the one or more second non-central antenna elements corresponds to a respective first non-central antenna element of a plurality of first non-central antenna elements of the first antenna panel at the first wireless device; and receiving, by the second wireless device, a second message comprising second alignment feedback information that indicates whether an angular difference between a first angle associated with a first non-central antenna element of the plurality of first non-central antenna elements and a second angle associated with a second non-central antenna element of the one or more second non-central antenna elements is less than a threshold angular difference, wherein the first angle is between the first non-central antenna element and a first axis of the first antenna panel and the second angle is between the second non-central antenna element of the second antenna panel and a second axis of the second antenna panel that is parallel to the first axis, and wherein the first non-central antenna element corresponds to the second non-central antenna element.

22. The method of claim 16, further comprising:

receiving, via a set of two or more antenna elements of the second antenna panel of the second wireless device, a second reference signal transmitted by a central antenna element of the first antenna panel of the first wireless device;

adjusting, based at least in part on measurements of the second reference signal at the set of two or more antenna elements, an angular rotation of the second antenna panel to modify a respective distance between each of the set of two or more antenna elements of the second antenna panel relative to the central antenna element of the first antenna panel; and transmitting, to the first wireless device, a second message indicating second alignment feedback information for the first antenna panel and the second antenna panel based at least in part on adjusting the angular rotation of the second antenna panel.

23. An apparatus for wireless communication at a first wireless device, comprising:

one or more processors;

one or more memories coupled with the one or more processors; and instructions stored in the one or more memories and executable by the one or more processors to cause the apparatus to:

transmit a first capability message indicating that the first wireless device supports a panel rotation capability;

receive a second capability message indicating that a second wireless device supports the panel rotation capability, the panel rotation capability associated with a capability of a respective wireless device to adjust an angular rotation of an antenna panel of the respective wireless device;

receive a configuration message that comprises a panel rotation procedure configuration based at least in part on the panel rotation capability, wherein the panel rotation procedure configuration comprises scheduling information for one or more reference signals;

receive, via a first set of two or more antenna elements of a plurality of antenna elements of a first antenna panel of the first wireless device, a reference signal of the one or more reference signals based at least in part on the panel rotation procedure configuration, wherein the reference signal is transmitted by a central antenna element of a second antenna panel of the second wireless device;

adjust, based at least in part on measurements of the reference signal at the first set of two or more antenna elements, an angular rotation of the first antenna panel of the first wireless device to modify a respective distance between each of the first set of two or more antenna elements of the first antenna panel relative to the central antenna element of the second antenna panel of the second wireless device; and transmit, to the second wireless device, a message indicating alignment feedback information for the first antenna panel and the second antenna panel.

24. The apparatus of claim 23, wherein the instructions are further executable by the one or more processors to cause the apparatus to:

receive a configuration message that comprises a panel rotation procedure configuration based at least in part on the panel rotation capability, wherein receiving the reference signal is based at least in part on the panel rotation procedure configuration.

25. An apparatus for wireless communication at a second wireless device, comprising:

one or more processors;

one or more memories coupled with the one or more processors; and instructions stored in the one or more memories and executable by the one or more processors to cause the apparatus to:

transmit a first capability message indicating that the second wireless device supports a panel rotation capability;

receive a second capability message indicating that a first wireless device supports the panel rotation capability, the panel rotation capability associated with a capability of a respective wireless device to adjust an angular rotation of an antenna panel of the respective wireless device;

communicate, with the first wireless device, a panel rotation procedure configuration based at least in part on the panel rotation capability, wherein the panel rotation procedure configuration comprises scheduling information for one or more reference signals;

transmit a reference signal of the one or more reference signals via a central antenna element of a second antenna panel of the second wireless device based at least in part on the panel rotation procedure configuration; and receive, by the second wireless device, a message indicating alignment feedback information for the second antenna panel of the second wireless device and a first antenna panel of the first wireless device based at least in part on the reference signal.

* * * * *